United States Patent
Willcocks et al.

(10) Patent No.: US 6,419,970 B1
(45) Date of Patent: *Jul. 16, 2002

(54) METHODS OF SETTING CHOCOLATE AND PRODUCTS PRODUCED BY SAME

(75) Inventors: Neil A. Willcocks, Columbia, NJ (US); Frank W. Earis, Maidenhead (GB); Thomas M. Collins, Nazareth, PA (US); Ralph D. Lee, Hampton, NJ (US); Wallace R. Palmer, West Chicago, IL (US); William Harding, Maidenhead (GB)

(73) Assignee: Mars, Incorporated, McLean, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/782,902

(22) Filed: Jan. 11, 1997

(51) Int. Cl.$^7$ .................................................. A23G 1/21
(52) U.S. Cl. ....................... 426/306; 426/515; 426/524; 426/660
(58) Field of Search ................................. 426/104, 601, 426/607, 660, 515, 297, 306, 524

(56) References Cited

U.S. PATENT DOCUMENTS

| | | | |
|---|---|---|---|
| 1,931,409 A | * 10/1933 | Humphrey | 426/104 |
| 2,353,594 A | * 7/1944 | Seagren | 426/104 |
| 2,487,931 A | * 11/1949 | Lataner | 99/23 |
| 2,760,867 A | 8/1956 | Kempf et al. | 99/24 |
| 3,229,647 A | * 1/1966 | Drachenfels et al. | 107/54 |
| 3,270,040 A | * 8/1966 | Bradshaw | 260/410.7 |
| 3,648,625 A | * 3/1972 | Glass | 425/93 |

(List continued on next page.)

FOREIGN PATENT DOCUMENTS

| | | |
|---|---|---|
| CH | 399891 | 4/1966 |
| CH | 409603 | 10/1966 |
| CH | 410607 | 10/1966 |

(List continued on next page.)

OTHER PUBLICATIONS

Beckett, "Industrial Chocolate Manufacture and Use", p. 156, 1994.*
Minifie, "Chocolate Cocoa and Confectionery: Science and Technology", $2^{nd}$ ed., AVI Pub. pp. 142–174, 1980.*
Patent Abstracts of Japan, vol. 8, No. 41 (C–211), Feb. 22, 1984.

(List continued on next page.)

*Primary Examiner*—Nina Bhat
(74) *Attorney, Agent, or Firm*—Fitzpatrick, Cella, Harper & Scinto

(57) ABSTRACT

The present invention discloses improved methods of making chocolates utilizing fast and aggressive cooling to form a set chocolate, chocolate products produced using same and cooling systems and apparatuses for performing same. The resultant rapidly cooled chocolate has many improved properties including enhanced gloss, improved bloom resistance and hardness. Moreover, the rapid cooling allows for the improved retention of fine detail and/or decoration on the chocolate product. The rapid cooling can be achieved without the use of chilled plungers or cold molds, but instead utilizes increased convective heat transfer coefficients and/or lower operating temperatures. The melted chocolate composition set by the rapid cooling can be of conventional temper, low temper or ultra-low temper chocolate and still result in a stable finished chocolate product allowing for the use of lower fat content formulations.

Another aspect of the invention relates to a method of using a controlled humidity environment in a rewarm zone after the cooling zone to form a thermally robust chocolate product having enhanced resistance to heat abuse, yet which still has good gloss.

28 Claims, 16 Drawing Sheets

SEC. A-A
START OF TUNNEL

U.S. PATENT DOCUMENTS

| | | | | |
|---|---|---|---|---|
| 3,692,451 A | * | 9/1972 | Sollich | 425/223 |
| 3,852,494 A | * | 12/1974 | Williamson | 426/383 |
| 3,935,321 A | * | 1/1976 | Sakler et al. | 426/244 |
| 4,081,559 A | | 3/1978 | Jeffrey et al. | 426/103 |
| 4,353,927 A | * | 10/1982 | Lovercheck | 426/101 |
| 4,369,200 A | * | 1/1983 | Iwao et al. | 426/660 |
| 4,426,402 A | * | 1/1984 | Kaupert | 426/515 |
| 4,431,678 A | * | 2/1984 | Sollich | 426/306 |
| 4,446,166 A | * | 5/1984 | Giddey et al. | 426/631 |
| 4,543,262 A | * | 9/1985 | Michnowski | 426/306 |
| 4,545,997 A | * | 10/1985 | Wong et al. | 426/94 |
| 4,563,363 A | * | 1/1986 | Yoon | 426/303 |
| 4,572,835 A | * | 2/1986 | Hachiya et al. | 426/306 |
| 4,832,971 A | * | 5/1989 | Michnowksi | 426/302 |
| 4,859,475 A | * | 8/1989 | Michnowski | 426/72 |
| 4,859,483 A | * | 8/1989 | Sollich | 426/519 |
| 4,865,856 A | * | 9/1989 | Groen | 426/93 |
| 4,877,636 A | * | 10/1989 | Koyano et al. | 426/607 |
| 4,888,196 A | * | 12/1989 | Ehrman et al. | 426/601 |
| 4,910,037 A | * | 3/1990 | Sagi et al. | 426/601 |
| 5,023,102 A | * | 6/1991 | Given, Jr. | 426/610 |
| 5,023,106 A | * | 6/1991 | Ehrman et al. | 426/660 |
| 5,032,418 A | * | 7/1991 | Sollich | 426/520 |
| 5,108,769 A | * | 4/1992 | Kincs | 426/93 |
| 5,188,853 A | * | 2/1993 | Sollich | 426/231 |
| 5,188,858 A | * | 2/1993 | Stipp et al. | 426/531 |
| 5,264,234 A | * | 11/1993 | Windhab et al. | 426/519 |
| 5,266,348 A | * | 11/1993 | Zumbé et al. | 426/660 |
| 5,271,950 A | * | 12/1993 | Yamaguchi et al. | 426/607 |
| 5,275,835 A | * | 1/1994 | Masterson et al. | 426/607 |
| 5,342,644 A | * | 8/1994 | Cain et al. | 426/660 |
| 5,354,572 A | * | 10/1994 | Miller et al. | 426/580 |
| 5,464,649 A | * | 11/1995 | St. John et al. | 426/660 |
| 5,514,396 A | * | 5/1996 | Aasted | 426/231 |
| 5,532,021 A | * | 7/1996 | Kida et al. | 426/607 |
| 5,589,216 A | | 12/1996 | Guskey et al. | 426/607 |
| 5,599,574 A | * | 2/1997 | Guskey et al. | 426/660 |
| 5,635,230 A | * | 6/1997 | Aasted | 426/138 |
| 5,705,217 A | * | 1/1998 | Aasted | 426/512 |
| 5,709,896 A | * | 1/1998 | Hartigan et al. | 426/103 |
| 6,001,404 A | * | 12/1999 | Mochizuki | |

FOREIGN PATENT DOCUMENTS

| | | | |
|---|---|---|---|
| CH | 489211 | | 6/1970 |
| DE | 113841 A | * | 7/1975 |
| EP | 237168 | | 9/1987 |
| EP | 276548 | | 8/1988 |
| EP | 390408 | | 10/1990 |
| EP | 517496 A1 | | 12/1992 |
| EP | 589820 A1 | | 3/1994 |
| GB | 620417 | | 3/1949 |
| GB | 620417 | | 8/1949 |
| GB | 2222255 A | | 2/1990 |
| GB | 2265460 A | | 9/1993 |
| WO | WO94-07375 | | 4/1994 |
| WO | 94 07375 | | 4/1994 |
| WO | WO95-32633 | | 12/1995 |

OTHER PUBLICATIONS

Patent Abstracts of Japan, vol. 4, No. 174 (C–033), Dec. 2, 1980.

Hank Whetstone, "Moulds and Moulding Examples and Techniques", Jun. 1996 pp. 93–99, The Manufacturing Confectioner.

R.L. Wille and E.S. Lutton, "Polymorphism of Cocoa Butter", J. Amer. Oil Chem. Society, vol. 43 (1966), pp. 491–496.

Bernard W. Minifie, Chocolate, Cocoa, and Confectioinery, 3rd Ed., pp. 195, 212–221, 578–580, and 647, (1989).

P.S. Dimick "Principles of Cocoa Butter Crystallization", 45th P.M.C.A. Production Conference, 1991.

Paper presentd by Roy Korfhage, before A.A.C.T. Atlanta Section Feb. 24, 1967, pp. 11–14.

Edward Sequire, "It Ain't Over Until . . . ", The Manufacturing Confectioner, Jun. 1995, preented at the Penn. Manufacturing Confectioiner's Association 49th Annual Conference.

J. Koch, Confectionary Production, "Some Thoughts on the Gloss of Chocolates", May 1978, pp. 182, 184 and 254.

* cited by examiner

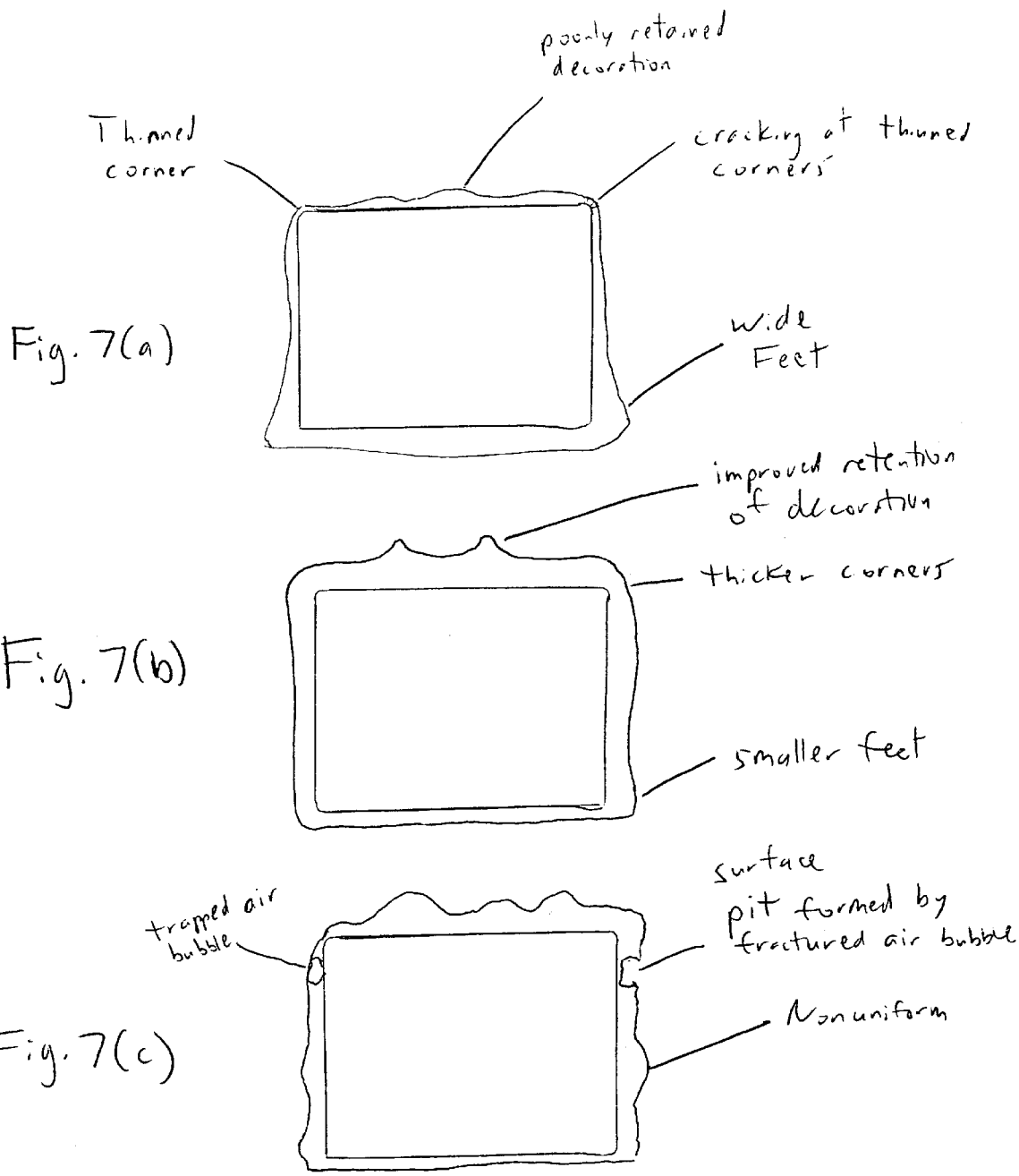

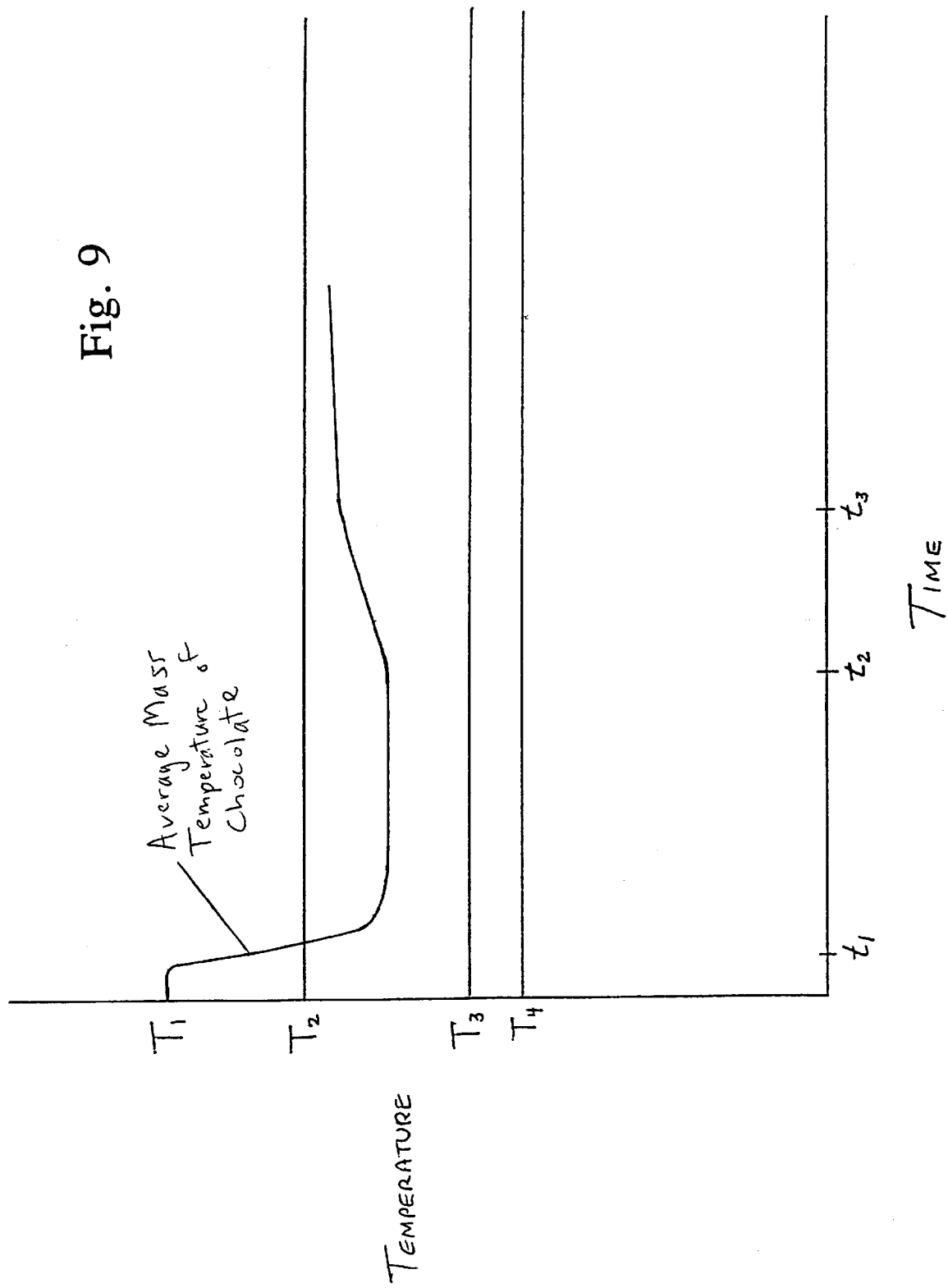

3 MUSKETEERS® Bar
Values over 40 indicate visible bloom

METHODS OF SETTING CHOCOLATE AND PRODUCTS PRODUCED BY SAME

BACKGROUND OF THE INVENTION

1. Field of the Invention

The invention relates to methods of setting chocolates, chocolate-like compositions and products produced by same. More specifically, the invention relates to methods of setting chocolate using a rapid cooling step by the use of very low temperatures, high heat transfer rates and/or short cooling times, using a controlled moisture rewarm zone and/or using a broader range of temper to form set chocolate products. The invention also relates to novel chocolate products having improved bloom resistance, enhanced gloss and other advantageous characteristics.

2. Description of the Related Art

Documents and references pertaining to the field of this invention are cited in this disclosure with a full citation for each; and, each cited document is hereby incorporated by reference.

The unique flavor and mouthfeel of chocolate is a result of the combination of numerous components as well as the process of manufacture. Chocolate contains solid particles dispersed throughout a fat matrix (the term "fat" includes cocoa butter and milk fat). Similarly, chocolate-like compositions may also contain fats other than cocoa butter or milk fat. Accordingly, melted chocolate and chocolate-like compositions are suspensions of non-fat particles (e.g., sugar, milk powders and cocoa solids) in a continuous liquid fat phase. The fat phase of milk chocolate, for example, is typically a mixture of cocoa butter, a suitable emulsifier, and milk fat. Cocoa butter is typically the predominant fat in the chocolates.

Cocoa butter is a polymorphic material in that it has the ability to crystallize in a number of different crystal packing configurations (Wille and Lutton "Polymorphism of Cocoa Butter", *J. Amer. Oil Chem. Society,* Vol. 43 (1966) pages 491–96). Six different polymorphic forms are generally recognized for cocoa butter. Forms I and II are produced, for example, by rapidly cooling melted untempered chocolate to low temperatures and are very unstable with low melting points. Forms III and IV melt at higher temperatures than Forms I and II but are not the most desirous forms for confectionery manufacture. Forms V and VI are the most stable forms of cocoa butter. It is desirable to have Form V as the predominant form in a well-tempered chocolate. Form V transforms slowly into Form VI after a period of time. Accordingly, chocolate processing is strongly linked to the crystallization and polymorphic behavior of the fat phase. Before chocolate can be satisfactorily processed from liquid to solid using conventional methods, it must be tempered after which it is gently cooled to form a set chocolate having a stable fat phase.

The most commonly used method of processing chocolate involves the following sequential steps:

A. complete melting of the chocolate fat phase;

B. cooling to the point of initial crystallization of the fat phase (i.e., below the melting point of the liquid fat phase);

C. crystallizing a portion of the liquid fat phase;

D. slight heating to melt out any unstable crystals that may have formed leaving from about 3 to 8 wt % as seeds for crystallizing the remaining liquid fat; and E. gently cooling to set the chocolate, typically in a cooling tunnel.

During conventional chocolate processing, the chocolate mixture is initially melted at temperatures of about 45° C. and tempered by cooling with agitation to about 29° to 30° C. The tempering of the chocolate results in a chocolate dispersion having fat crystals dispersed throughout the liquid fat phase. The chocolate suspension may then be further processed prior to setting by, for example, enrobing the chocolate onto an edible center or molding the chocolate. The chocolate is finally set into a form sufficiently solid for wrapping by gentle, controlled cooling.

Conventional tempering is the controlled partial precrystallization of the fat phase which is believed to be necessary to produce a stable solid form of the fat in the finished product. Therefore, one important object of tempering is to develop a sufficient number of stable seed crystals so that under appropriate cooling conditions the fat phase of the chocolate is able to crystallize into a stable polymorphic form. Tempering plays a key role in ensuring that the cocoa butter crystallizes in the stable form. "Chocolate must be properly tempered. Undertempered chocolate causes delayed setting in the cooler and adhesion to [processing equipment such as a] conveyor belt, and ultimately bad chocolate color and fat bloom" (see *Chocolate, Cocoa and Confectionery: Science and Technology,* by Minifie, 3rd Ed., p. 218).

Although it is important that the chocolate is well seeded with stable forms of cocoa butter crystals, the tempered chocolate still contains a high proportion of liquid cocoa butter, estimated from about 92 to 97 wt % of the fat phase. This must be solidified in the cooling process so that the set chocolate can be wrapped and ultimately be completely solidified into a stable crystalline form. (see *Chocolate, Cocoa and Confectionery: Science and Technology,* by Minifie, 3rd Ed., p. 195).

In cooling tunnels used in commercial processing, the crystallization of the remaining liquid fat phase must take place without further treatment while the chocolate is setting. The setting of chocolate occurs when the material has already been enrobed or placed in a mold, for example. That is, the chocolate is set while not subjected to flow or mixing. It only takes a slightly lower temperature to complete the transition from the liquid to the solid state, since the tempered chocolate is already partially solidified (see *Industrial Chocolate Manufacture and Use* by S. T. Beckett, Second Edition, page 232). The purpose of conventional cooling tunnels is to make the chocolate sufficiently solid so that it may be wrapped at room temperature.

Conventional methods passively cool the chocolate to promote crystalline growth throughout the fat phase using cooling environments having operating temperatures between 10 and 20° C. It In fact, conventional wisdom dictates that the liquid chocolate must not meet very cold air because it is believed to make the remaining cocoa butter unstable (see *Chocolate, Cocoa and Confectionery: Science and Technology* by Bernard W. Minifie, Third Edition, pages 212–221, particularly page 212). It is currently believed that the chocolate must be allowed to cool gently and not be subjected to aggressive cooling through exposure to low temperatures, as this has the effect of quickly drawing the cocoa butter up to the surface of the product, resulting in fat bloom (see *Industrial Chocolate Manufacture and Use* by S. T. Beckett, Second Edition, page 232).

With colder air more unstable crystals will be formed and the possibility of subsequent bloom developing is greater. It has been recommended that for the conventional forced circulation tunnel the air be brought in at a temperature not lower than 45° F., preferably considerably higher. (Paper presented by Dr. Roy F. Korfhage, Ambrosia Chocolate Company, before the A.A.C.T. Atlanta Section, Feb. 24, 1967, pages 13–14.) It was previously believed that "too cold too soon" would result in products which would appear greasy as the warmer coating, under the prematurely hardened surface skin, will work its way to the surface in the heat transfer process. The preferred cooling system was a zoned system where the product entered the cooler at about 65° F. (*Principles of Cocoa Butter Crystallization*, by Dimick, 45th P.M.C.A. Production Conference, 1991).

Accordingly, conventional cooling is relatively passive in that the heat transfer rate is low. A typical cooling tunnel cools a chocolate from a temperature of about 29–30° to about 10–25° C. in a period of time typically greater than about 7 minutes.

One disadvantage of the requirement that the chocolate be set by gentle cooling is the extended period of time resulting from the slow cooling. This results in either the requirement that the chocolate move slowly through the cooling zone, reducing the speed and efficiency of commercial chocolate processing lines, and/or requiring very long cooling tunnels to provide for slow cooling while maintaining a fast production line. Typical commercial cooling tunnels are on the order of 10 to 100 meters long depending on the size of the chocolate piece and the speed of the conveying belt. As a result, the buildings housing such facilities must be large enough to accommodate such tunnels. This greatly increases the capital requirements for any conventional commercial processing facility.

Yet another disadvantage of the prior methods of making chocolate confections is the inability to consistently make chocolate products having a high surface gloss. The surfaces of molded chocolates that were in contact with the mold have very high gloss compared with enrobed products made with the same chocolate composition produced without the use of a mold. It is believed that the chocolate wets the surface of ambient temperature molds thereby reducing the fat retraction from the surface that may occur during cooling. However, the use of a mold to form a chocolate product is much slower and less efficient than non-mold processes such as enrobing. A conventional enrobing line can achieve efficiencies up to 10,000 pieces/minute compared with 2,000 for molding lines. The inability to provide the high gloss and high detail comparable to that of a molded product without the use of a mold reduces commercial efficiencies of conventional chocolate processing facilities.

U.S. Pat. No. 3,229,647 to Drachenfels et al. relates to a method for processing chocolate compositions, masses and coatings comprising a step in which a flowable pre-heated mass is subjected in a storage container to a cooling process in order to produce fat crystals. The method involves subjecting a pre-heated heated chocolate mass to undercooling in contact with a cooling surface to 21–25° C.

U.S. Pat. No. 5,275,835 to Masterson relates to a process for preparing chocolate-flavored confectionery compositions containing reduced calorie substitute fats using certain dynamic tempering conditions. An object of the patent is reducing the time needed for tempering flavored compositions. The method involves dynamically tempering the compositions by rapidly cooling from a non-crystalline state to a temperature of less than about 70° F. (21.1° C.) and then warming the composition to about 85° F. (29.4° C.) while subjecting the tempered composition to shear agitation and subsequently setting the tempered chocolate by cooling.

PCT Patent Publication WO 95/32633 to Aasted relates to a method for producing molded shells of fat-containing, chocolate-like masses wherein a mold cavity is filled with a mass and a cooling member having a temperature below 0° C. is subsequently immersed in the mass to define a predetermined shell volume between the member and the mold cavity.

European Patent Application 0 589 820 to Aasted relates to a method for producing molded outer shells of fat-containing, chocolate-like masses wherein a mold cavity is filled with a tempered chocolate-like mass which solidifies from the mold cavity inwardly to form the outer shape of the shell, the temperature of the mold cavity being lower than the temperature of the tempered mass. The mold cavity is filled with a chocolate-like mass in an amount which is just slightly larger than the volume of the finished shell. A cooling member, which has preferably been cooled to −15 to −30° C., is then immersed into the chocolate mass and kept in a fully immersed position for about 2 to 3 seconds. The chocolate-like mass will then solidify rapidly during crystallization from the cooling member and will readily release the cooling member, which can be lifted up and out of the mold cavity.

PCT Patent-Publication WO 94/07375 to Cebula et al. relates to forming fat-containing products such as chocolate in molds at temperatures at or below 0° C. to provide unforced demolding.

U.S. Pat. No. 3,935,321 to Sakler et al. relates to the production of food products having at least an outer layer of a material which is heat liquified in the formation of the product and which crystallizes upon cooling to provide a glossy surface. This is achieved by subjecting the product to a corona current after the surface of the product has hardened to rapidly extract heat from the inner regions of the material.

U.S. Pat. No. 4,426,402 to Kaupert relates to a method and apparatus for producing chocolate forms using molding tools. During a injection step, the molding tool is cooled with a coolant, wherein one of the molding parts is maintained at about 20° C., while the other is maintained at a substantially lower temperature of 0° C. or less, such as about −5° C. Even lower temperatures, such as −10° C. and even −20° C., are disclosed as acceptable for still faster molding speeds if the formed chocolate body is carefully handled.

All of these references fail to teach or suggest methods of setting chocolate using a rapid cooling step without the use of a mold using low temperatures (5° C. and below), high convective heat transfer coefficients and/or short times to provide an acceptable finished chocolate confection, i.e., bloom resistant, good gloss and hardness, etc. In fact, the related art teaches that setting chocolate using a rapid cooling step is to be avoided at all cost. The slow setting times of conventional methods greatly increases the time required for making chocolate products. The references also fail to teach or it suggest improved chocolate products having increased resistance to bloom and other advantageous properties, including potentially improved gloss and retention of fine detail and decoration, which is achieved while reducing the cooling times using the present invention. Moreover, the references also fail to teach or suggest methods which enable the setting of ultra-low temper chocolate.

Thus, the development of methods which increase the speed and efficiencies of chocolate processing lines, while at the same time providing improved products, is a highly valuable addition to the art.

There has also been a long felt desire to produce a heat stable or heat resistant, enrobed chocolate product. As discussed above, ordinary chocolate is composed primarily of fats or fatty substances, such as cocoa butter, in which there are dispersed non-fat products such as cocoa components, sugars, proteins, etc. Therefore, since chocolate is primarily constituted by fat bodies, its melting temperature is relatively low. This means that ordinary chocolate is not particularly resistant to summer temperatures or the heat of tropical countries. In fact, many chocolates have a greasy or oily texture when handled and sometimes even melt when picked up or handled. Therefore, a need exists for a chocolate which is more resistant to melting at relatively high ambient temperatures and/or drier to the touch.

A variety of means have been utilized in the past to attempt to remedy the relatively low melting temperature of ordinary chocolate. For example, fats of higher melting temperature can be selected for incorporation into the chocolate.

However, this procedure can result in chocolate having undesirable mouthfeel, taste and/or texture. In fact, a composition that does not contain cocoa butter cannot be called "chocolate" in the United States under the Food and Drug Administration Guidelines.

Methods which disrupt the continuous chocolate fatty phase, thereby minimizing the influence of the melting point of the fat on the overall softening of the chocolate mass, have also been used. Such disruption of the continuous chocolate fatty phase has been effected in the past by various means, including direct water addition to the chocolate. Unfortunately, chocolate manufactured by direct water addition may exhibit inferior product quality due to a coarse, gritty texture. More importantly, the addition of water to chocolate results in a chocolate having extremely high viscosities, thus making the chocolate unsuitable for enrobing.

Disruption of the continuous chocolate fatty phase has also been effected by including a variety of particles in the composition, often solid particles. These processes unfortunately often result in an undesirable rough texture, or mouthfeel, in the chocolate. Moreover, the addition of any solids to the chocolate suspension will increase the viscosity of the system.

Swiss Patent No. 410,607 concerns a chocolate composition which contains hydrophilic substances such as dextrose, maltose, inverted sugar, etc. When chocolate is made with such a composition, it is exposed to a moist atmosphere whereby it absorbs a certain quantity of water. This causes a relative increase in the volume occupied by the hydrophilic substances and was said to improve heat resistance.

Additionally, Swiss Patent Nos. 399,891 and 489,211, are directed to a method of incorporating amorphous sugars into a chocolate composition during manufacture. The sugars cause the formation in the mass of a lattice structure which prevents collapse of the mass when the temperature exceeds the melting point of the fat bodies used in its preparation.

Swiss Patent No. 409,603 involves the direct incorporation of water into a chocolate composition during its manufacture. The water however, which is about 5% relative to the composition, causes a rapid thickening of the mass at temperatures where normally the mass is still a liquid. Unfortunately, since the mass is no longer liquid, it is not possible to use the composition to cast chocolate into molds. Thus, the composition must be ground and the obtained powder must be pressed into shape by compression molding.

U.S. Pat. No. 2,760,867 involves the incorporation of water into chocolate by the addition of an emulsifier such as lecithin.

U.S. Pat. No. 4,081,559 concerns the addition to chocolate of an amount of sugar such that when the quantity of water required to obtain heat-resistant chocolate is added, an aqueous sugar solution is formed in which at least one edible fat of the chocolate is emulsified.

U.S. Pat. No. 4,446,116 is directed to a composition used in the preparation of a heat-resistant chocolate article. However, the water-in-fat emulsion prepared in accordance with the teachings of this patent results in a product containing at least 20% of the fat in solid form, and the water-in-fat mixture used in accordance with this patent does not remain in liquid form during processing. Presence of such solid bodies results in an undesired rough texture or mouthfeel.

U.K. Patent specification 620,417 relates to the production of edible heat-resistant chocolate having a sugar skin produced by applying moisture to the surface of the chocolate to form a continuous skin of crystallized sugar over the chocolate. The resultant film is firmly interlocked with the chocolate surface preventing the film from chipping off or becoming detached. The moisture may be applied either while the chocolate, after tempering, is still plastic, or after it has frozen or set. The moisture can be applied by dipping the enrobed product into a water bath or subjecting the enrobed product to a mist or spray. Preferably, the pieces are subjected to an atmosphere substantially saturated with moisture. It is convenient to apply the moisture before the cooling apparatus. This reference discloses the use of high relative humidities, i.e., 90 to 95%.

Thus, the provision of a suitable method of making a heat-resistant or thermally robust enrobed chocolate, without substantially negatively affecting gloss or other attributes such as the taste, texture, mouthfeel, appearance or other important characteristics of the chocolate, or significantly reducing the efficiency of chocolate processes is a valuable addition to the art.

OBJECTS OF THE INVENTION

It is an object of the present invention to overcome the above-mentioned difficulties in the prior art.

It is another object of the present invention to provide improved methods for setting chocolate that provide improved enrobed and/or deposited chocolate confectionery products.

It is another object of the invention to provide improved enrobed chocolate products having enhanced bloom resistance, increased resistance to heat damage while maintaining good gloss and/or other advantageous characteristics.

It is a further object of the present invention to provide a method of setting chocolate within a shorter period of time and/or using shorter cooling tunnels.

It is a further object of the present invention to provide a means for the retention of fine detail and decoration on chocolate confectionery products.

It is a still further object of the present invention to provide methods of setting chocolate which may utilize ultra-low temper chocolate compositions.

It is an additional object of the present invention to provide a method of setting chocolate which results in a chocolate having higher resistance to fat bloom and potentially higher gloss.

It is yet another object of the present invention to provide a method of producing a chocolate having enhanced resistance to melt or heat damage.

It is a still further object of the invention to provide a method of setting chocolate using less fat in the chocolate composition without the detrimental increases in processing viscosity.

It is a still further object of the invention to provide a cooling tunnel which allows for the use of very low temperatures and/or very high heat transfer rates.

These and other objects and advantages of the present invention will become further apparent from the teachings hereinafter provided by the detailed description, test data, and examples.

SUMMARY OF THE INVENTION

The present invention relates to improved methods of making chocolates and improved chocolate products made using same. The invention departs completely from what was previously believed by chocolatiers in the art. Rather than gently or passively cooling chocolates, the present invention relates to methods which utilize fast and aggressive cooling to form a set chocolate.

According to one aspect of the invention, melted chocolate is rapidly cooled thereby setting the chocolate by solidifying at least a portion of the liquid fat phase into a stable form, i.e., polymorph form V or greater. The melted chocolate is set by rapidly cooling to form a solid set chocolate. The resultant rapidly cooled chocolate has many improved properties including enhanced gloss, improved bloom resistance and hardness. It is believed that the rapid cooling results in a solidified fat matrix having smaller fat crystals.

The cooling zone(s) used during the present invention provides for a more aggressive cooling and thus cools the chocolate more rapidly. Conventional non-mold cooling methods typically require greater than 7 minutes for setting. The rapid cooling of the present invention preferably results in the setting of chocolate in about 5 minutes, and even as low as 1.0 minute. The rapid cooling is achieved without the use of chilled plungers or cold molds, but instead utilizes increased convective heat transfer coefficients and/or lower operating temperatures.

Chocolate products produced by methods involving rapid cooling have a higher resistance to fat bloom and other advantageous properties including enhanced gloss. Moreover, the rapid cooling allows for the improved retention of fine detail and/or decoration on the chocolate product.

One particularly preferred embodiment relates to rapid cooling after enrobing the melted chocolate onto a food product. This provides an improved chocolate enrobed product with an enhanced resistance to bloom.

The melted chocolate composition set by the rapid cooling can be of conventional temper, low temper or ultra-low temper chocolate. Accordingly, another aspect of the invention relates to the ability to set low and ultra-low temper chocolate and still result in a stable finished chocolate product. Surprisingly, it has been discovered that rapidly cooling the melted chocolate allows for the use of a chocolate that has very little temper. In such a chocolate, the solids load in the system is decreased allowing for decreased viscosities to facilitate processing. For example, a low temper chocolate has less fat crystallized, i.e., more liquid fat and less solidified fat. This allows the chocolate composition to be processed, by enrobing or pumping through an apparatus, without the increases in viscosity typically associated with conventionally tempered chocolate. The ability to set chocolates having low and ultra-low temper levels are surprising and unexpected advantages of the presently disclosed rapid cooling. In fact, the chocolate compositions which were successfully processed using the invention were of such low temper that new methods of measuring these low temper levels were required.

A still further aspect of the invention relates to shearing a chocolate that has little or no temper immediately prior to, or immediately after, the initiation of rapid cooling to form a stable set chocolate having the characteristics of a set chocolate formed using conventionally tempered chocolate. The use of no temper chocolate provides the ability to work with chocolate compositions at processing, i.e., enrobing temperatures having even further decreased viscosities at any given fat content.

Yet another aspect of the invention relates to the use of a rewarm zone having high heat transfer rates after the cooling zone. This allows not only the ability to increase the speed of processing lines, but also results in chocolate products having further improved properties such as even further improved bloom resistance and gloss.

Yet another aspect of the invention relates to a method of using a controlled humidity environment in a rewarm zone after the cooling zone to form a thermally robust chocolate product having enhanced resistance to heat abuse, yet which still has good gloss. The resultant product has a drier, less greasy surface texture.

A still further aspect of the invention relates to slow warming of the set chocolate to room temperature to form a chocolate having additional advantageous characteristics including further improved and/or consistent gloss and enhanced resistance to fat bloom. It is believed this results in a fat crystalline structure having even finer fat crystal sizes.

Another aspect of the invention relates to cooling systems and apparatuses designed to provide the presently claimed rapid cooling.

BRIEF DESCRIPTION OF THE DRAWINGS

Specific embodiments of the present invention will now be described further, by way of example, with reference to the accompanying drawings, in which:

FIG. 7(a) is a cross-sectional view of a chocolate coating of a chocolate enrobed edible product made by a representative conventional method. FIG. 7(b) is a cross-sectional view of a chocolate coating of a chocolate enrobed edible product made by a method according to an embodiment of the invention. FIG. 7(c) is a cross-sectional view of a chocolate coating of a chocolate enrobed edible product made by another conventional method;

FIG. 9 is a graphical representation of a time-temperature profile of another chocolate processed according to another embodiment of the invention wherein the horizontal axis represents time and the vertical axis represents temperature;

A. Definitions

1. Chocolate

Figure 1:
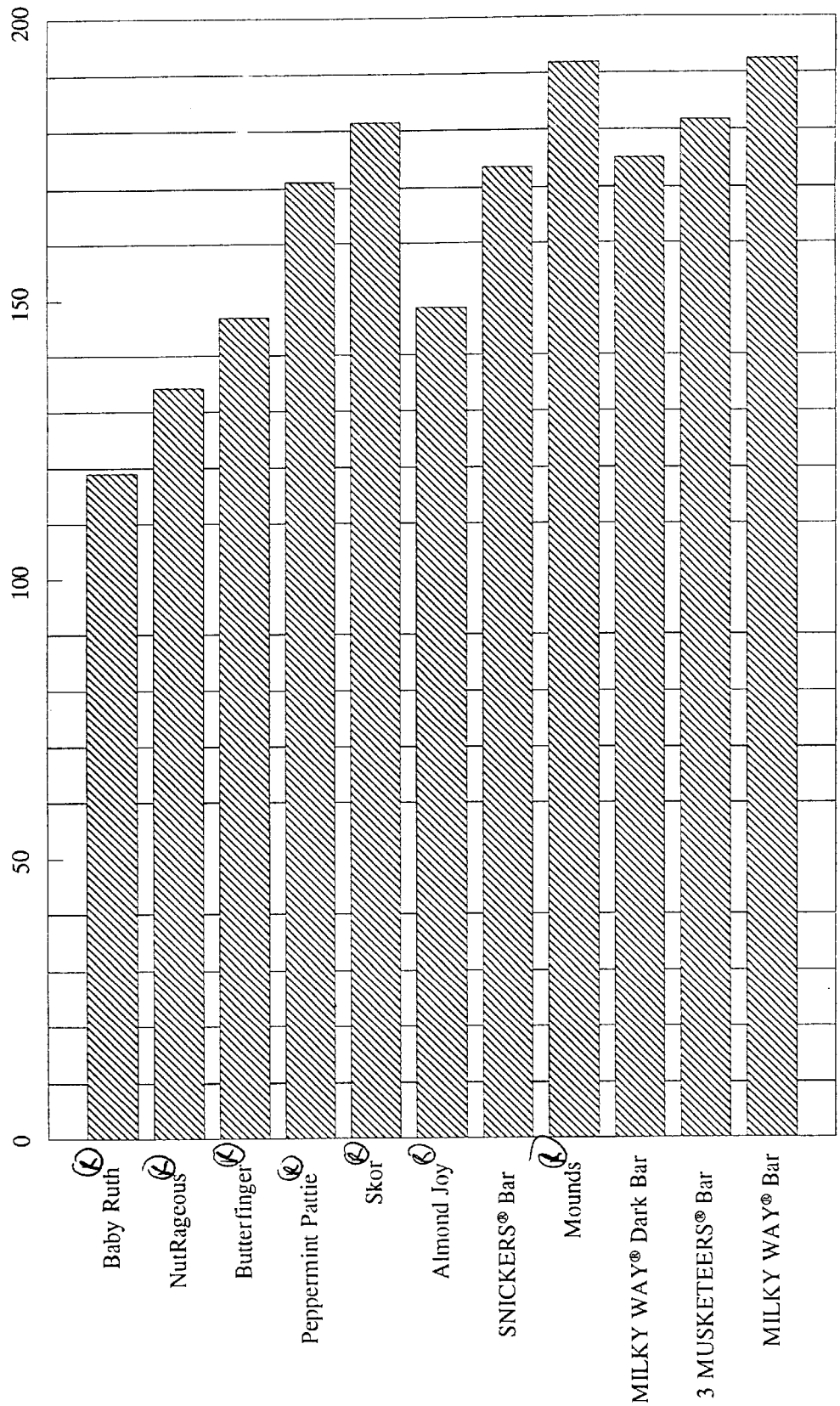
FIG. 1 is a horizontal bar graph of the measured gloss levels of a variety of commercial enrobed confectionery products.

The term "chocolate" is intended to refer to all chocolate or chocolate-like compositions with a temperable fat phase. As the invention is directed to the control of the characteristics of the fat or fat-like phase of the chocolate, rather than the non-fat materials within the chocolate, the term is intended to include all chocolate and chocolate-like compositions that contain at least one cocoa or cocoa-like component in the temperable fat or temperable fat-like phase. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, non-standardized chocolates and chocolate-like compositions, unless specifically identified otherwise.

The fat phase of the chocolate of the present invention can include cocoa butter, milkfat, anhydrous milkfat, butteroil, and other fats which are tempered like cocoa butter or mixtures of cocoa butter with these other fats (see definition of "temperable fats" below). See Minifie, *Chocolate, Cocoa and Confectionery Science and Technology* 3rd Ed. pages 100–109.

The invention does not include chocolates which do not contain fats that behave similar to cocoa butter, i.e., are not temperable like cocoa butter and are not polymorphic like cocoa butter. Examples of fats not included in the present invention are any vegetable fats or modified vegetable fats or combinations of these fats which are not tempered like cocoa butter.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions which fall outside the specified ranges of the standardized chocolates.

Chocolates also includes those containing crumb solids or solids fully or partially made by a crumb process.

Examples of nonstandardized chocolates result when the nutritive carbohydrate sweetener is replaced partially or completely; or when the cocoa butter or milkfat are replaced partially or completely; or when components that have flavors that imitate milk, butter or chocolate are added or other additions or deletions in formula are made outside the USFDA standards of identify of chocolate or combinations thereof.

The chocolate may contain a sugar substitute. The term "sugar substitute" includes bulking agents, sugar alcohols (polyols), or high potency sweeteners or combinations thereof. In an alternative embodiment of the present invention, a sugar substitute may partially replace the nutritive carbohydrate sweetener. The high potency sweeteners include aspartame, cyclamates, saccharin, acesulfame, neohesperidin dihydrochalcone, sucralose, alitame, stevia sweeteners, glycyrrhizin, thaumatin and the like and mixtures thereof. The preferred high potency sweeteners are aspartame, cyclamates, saccharin, and acesulfame-K. Examples of sugar alcohols may be any of those typically used in the art and include sorbitol, mannitol, xylitol, maltitol, isomalt, lacitol and the like.

The chocolates may also contain bulking agents. The term "bulking agents" as defined herein may be any of those typically used in the art and include polydextrose, cellulose and its derivatives, maltodextrin, gum arabic, and the like.

The chocolate products of the present invention may contain emulsifiers. Examples of safe and suitable emulsifiers may be any of those typically used in the art and include lecithin derived from vegetable sources such as soybean, safflower, corn, etc., fractionated lecithins enriched in either phosphatidyl choline or phosphatidyl ethanolamine or both, mono- and digylcerides, diacetyl tartaric acid esters of mono- and diglycerides (also referred to as DATEM), PGPR, monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids, propylene glycol mono- and diester of fats and fatty acids, or emulsifier that may become approved for the USFDA-defined soft candy category. In addition, other emulsifiers that can be used in the present invention, include polyglycerol polyricinoleate, ammonium salts of phosphatidic acid, sucrose esters, oat extract, etc., any emulsifier found to be suitable in chocolate or similar fat/solid system or any blend provided the total amount of emulsifier does not exceed 1% by weight. Emulsifiers preferred for use in the present invention are lecithin, fractionated lecithin, diacetyl tartaric acid esters of mono- and diglycerides (DATEM) or mixtures of these emulsifiers at a maximum level of 1% of any one emulsifier or any mixture of emulsifiers.

Nutritive carbohydrate sweeteners with varying degrees of sweetness intensity useful in the present invention may be any of those typically used in the art and include, but are not limited to, sucrose, e.g. from cane or beet, dextrose, fructose, lactose, maltose, glucose syrup solids, corn syrup solids, invert sugar, hydrolyzed lactose, honey, maple sugar, brown sugar, molasses and the like. The nutritive carbohydrate sweetener, preferably sucrose, will be present in the chocolate as crystals or particles.

2. The term "chocolate confection" refers to chocolate products that are stable at ambient temperatures for extended periods of time (i.e., greater than 1 week). These products are characterized as microbiologically shelf-stable at 65°–85° F. under normal atmospheric conditions. The term "confection" is not intended to include ice cream products or other products that are typically stored at temperatures below 0° C. and which are designed to be consumed while in a frozen state. As a confection, chocolate can take the form of solid pieces of chocolate, such as bars or novelty shapes, and can also be incorporated as a component of other, more complex confections where chocolate is combined with and generally coats other foods such as caramel, nougat, fruit pieces, nuts, wafers or the like. Other complex confections result from surrounding soft inclusions such as cordial cherries or peanut butter with chocolate and other complex confections result from coating ice cream or other frozen or refrigerated desserts with chocolate. However, chocolate coatings on ice cream or other frozen products typically do not contain stable fat crystals and are not included in the present invention.

3. The term "chocolate-like compositions" refers to chocolate flavored compositions containing solid particles dispersed in a fat or fat-like phase.

4. The term "cooled chocolate" refers to a melted chocolate which has been cooled to produce a solid chocolate wherein substantially all of the fat is in a solid state.

5. The term "crystalline fat" refers to a liquid fat which has been cooled to allow the fat to undergo a phase transition to any of a number crystalline forms or polymorphs. For example cocoa butter may crystallize as any one six recognized polymorphs.

6. The term "molding" refers to methods wherein chocolate, either plain or mixed with additives such as nuts, raisins, crisped rice and the like is deposited in molds, allowed to cool and hardened into solid pieces. The chocolates used in molding processes usually can be somewhat more viscous than coating chocolates since the chocolate can be vibrated and/or forced into a mold over a longer period of time than allowed in enrobing, for example. However, chocolate molded with food inclusions generally must be as fluid as coating chocolates.

7. The term "fats", as used herein, refer to triglycerides, diglycerides and monoglycerides that can normally be used in chocolates and chocolate-like products. Fats include the naturally occurring fats and oils such as cocoa butter, pressed cocoa butter, expeller cocoa butter, solvent extracted cocoa butter, refined cocoa butter, milkfat, anhydrous milkfat, fractionated milkfat, milkfat replacers, butterfat, fractionated butterfat, cocoa butter equivalents (CBE), cocoa butter substitutes (CBS) and synthetically modified fats such as Caprenin®.

8. "Reduced calorie fat", as used herein, is a fat having all the properties of typical fat but exhibiting less calories than typical fat. An example of a reduced calorie fat is Caprocaprylobehein (commonly known as Caprenin®) as described in U.S. Pat. No. 4,888,196 to Ehrman, et al., which is incorporated herein by reference.

9. The term "temperable fat" is intended to refer to cocoa butter and other fats having properties similar to cocoa butter and which are tempered in the same manner as for cocoa butter. "Temperable fats" can exist in a number of different crystalline forms or polymorphs and which are typically processed by tempering to provide seed crystals of the more stable crystalline polymorphs.

The term "temperable fat" does not include fats or fat-like materials that do not require tempering. The term does not include fats that are typically tempered by methods which are significantly different than those methods typically used for tempering cocoa butter.

For example, Caprenin® is a material sometimes used as a fat replacer, but would not be considered a "temperable fat" according to the invention since its method of setting is different from that of cocoa butter. Caprenin® is a low calorie fat replacer developed by Procter and Gamble to replace cocoa butter functionally and organoleptically. The Caprenin® molecule is a triglyceride with a glycerine backbone and a mixture of caprylic, capric and behenic fatty acid chains. The length of the behenic fatty acid chain inhibits absorption of the molecule as a triglyceride in the human body. This property, which reduces the effective caloric density of Caprenin®, also leads to significant difficulties in crystallization and solidification. Caprenin® containing chocolate-like coatings, for example, require careful handling to achieve the desirable properties for the finished product. In fact, Caprenin®-based chocolate flavored compositions are conventionally set by tempering and cooling methods that differ significantly from those methods typically used for cocoa butter.

The alpha state of Caprenin® forms readily. The beta state, however, does not occur easily or quickly. Significant experimentation was necessary to develop procedures that would allow the stable form of Caprenin® to develop. As set forth in U.S. Patent No. 5,275,835 to Masterson, if chocolate products based on caprenin are tempered using typical equipment and conditions conventionally used for cocoa butter-based chocolate products, i.e., rapidly cooling to about 82 to 86° F. (27.8 to 30.0° C. and then warming to about 88 to 93° F. (31.1 to 33.9° C.), the products do not harden sufficiently when cooled to be wrapped or otherwise packaged, nor shrink sufficiently in molds to be easily demolded with glossy appearance, and will develop bloom.

In fact, Caprenin®-based chocolate flavored compositions are conventionally set by cooling methods that differ significantly from conventional cooling methods used for cocoa butter. The term "Caprenin®-based chocolate flavored compositions" refers to those compositions wherein greater than 50 wt % of the fat is Caprenin®. U.S. Pat. No. 4,888,196 discloses rapidly cooling a Caprenin®-based chocolate flavored composition to temperatures below 57° F. (13.9° C.) and holding at that temperature for more than 16 hours, which is sufficient to form, or nucleate, an effective amount of beta crystals from a portion of the Caprenin®. The cooled composition is then warmed to a temperature in the range of from about 57 to about 72° F. (about 13.9 to 22.2° C.) to transform the remaining portion of the Caprenin® into stable beta crystalline phase in about 4 to 120 hours. Using the tempering scheme disclosed in U.S. Pat. No. 4,888,196, it typically takes from about 1 to about 3 days after preparing the molten chocolate mass to obtain the chocolate-flavored products which are stable against resulting bloom formation, especially when subjected to thermal stress. Holding for less than 24 hours resulted in an unsatisfactory product.

U.S. Pat. No. 5,275,835 to Masterson relates to a process for preparing chocolate-flavored confectionery compositions containing the reduced calorie substitute fat Caprenin® using certain dynamic tempering conditions. An object of the patent is reducing the time needed for tempering flavored compositions. The method involves dynamically tempering the compositions by rapidly cooling from a non-crystalline state to a temperature of less than about 70° F. (21.1° C.) and then warming the composition to about 85° F. (29.4° C.) while subjecting the tempered composition to shear agitation and subsequently setting the tempered chocolate by cooling.

Comparing these processes with those set forth above regarding conventional chocolate processing, it can be seen that all fats that can be tempered do not behave like cocoa butter. Such fats are not intended to be included within the scope of the invention.

10. The term "bloom stable chocolate" refers to chocolate products having good shelf-life. More specifically, to chocolate products capable of resisting the development of visually detectable (without magnification) fat bloom when stored at ambient temperatures over extended periods of time. Ideally, bloom stable products should also be able to withstand some degree of thermal stressing conditions near ambient temperatures over extended periods of time without the development of visually detectable fat bloom. For example, a chocolate may be characterized as being "bloom stable" if it does not bloom after exposure to five 24 hour cycles comprised of 8 hours at 30° C. (86° F.) followed by 16 hours at 21.1° C. (70° F.).

11. The term "gloss" refers to a physical property which is characteristic of the visual appearance of a chocolate and is very important for consumer acceptance. More specifically, gloss refers to the ability of the surface of a chocolate product to reflect incident light giving a "shiny" or "glossy" appearance. Gloss can be measured in a variety of ways both visually and instrumentally.

The gloss data described herein was determined using the Tricor Glossmeter Model 801A. The products to be measured were held in the holder in the measurement chamber such that the surface to be measured is at the same level relative to the light source and camera for all products. The meter is calibrated prior to each use using the Tricor Gloss standard reference plate which has a defined gloss level of 255. The measurement evaluated is the average gloss of the 5% brightest pixels with a threshold of 1. Typical subjective gloss values as related to Tricor measured gloss values are compared in Table I set forth below:

TABLE I

| Subjective | Gloss Reading |
| --- | --- |
| Excellent | >190 |
| Good | 175 to 189 |
| Fair | 160 to 174 |
| Min. Acceptable | 150 |
| Poor | 149 and below |

FIG. 1 is a horizontal bar graph depicting gloss levels of a variety of commercial chocolate enrobed confectionery products measured by the above methods. The products were purchased from at least three locations to provide a more representative sampling:

| Product | Number of Bars Tested |
| --- | --- |
| Baby Ruth ® | 6 |
| NutRageous ® | 6 |

-continued

| Product | Number of Bars Tested |
| --- | --- |
| Butterfinger ® | 5 |
| Peppermint Pattie ® | 6 |
| Skor ® | 6 |
| Almond Joy ® | 4 |
| SNICKERS ® Bar | 6 |
| Mounds ® | 6 |
| MILKY WAY ® Dark Bar | 6 |
| 3 MUSKETEERS ® Bar | 6 |
| MILKY WAY ® Bar | 6 |

12. The term "glossy" refers to a chocolate having an acceptable gloss, i.e., not dull, substantially uniform, etc. Although a relatively subjective term, the use of the term is well known to those skilled in the art.

13. The term "set chocolate product" refers to a product in which sufficient fat has solidified at a given temperature to provide the product with a minimum degree of physical integrity, such that its shape and appearance are maintained at the given temperature.

14. The term "stable fat crystals" refers to those crystalline forms or polymorphs that are stable at higher temperatures, that is these polymorphs have higher melting points. For cocoa butter, six crystal polymorphs have been recognized and characterized both by thermal analysis and X-ray diffraction and these six forms are well known to those skilled in the art of chocolate manufacture (see Wille et al. "Polymorphism of Cocoa Butter", J. Am. Oil Chem. Soc., Vol. 43 (1966) pages 491–96). Referring to cocoa butter then, the term "stable fat crystals" is meant to include the form V and form VI polymorphs which melt at higher temperatures. The term "unstable fat crystals" refers to the remaining lower melting lower polymorphs.

15. The term "sugar solubilizing agent" refers to a reagent capable of solubilizing sugar under typical processing conditions (i.e., within a period of time less than 1 hour at a temperature less than 35° C.). One suitable reagent comprises water.

16. The term "surface robust chocolate" refers to products capable of being picked up by hand 24 hours after the cooling treatment, wherein there is reduced and/or delayed melting in the hand. The surface texture of this chocolate has a drier, less greasy feel, yet still maintains acceptable gloss.

17. The term "temper" refers to the presence of stable fat crystals in a chocolate. The degree or level of temper in a chocolate can be measured by commercially available instruments which characterize the behavior of a chocolate sample during controlled cooling. An example of this type of instrument is the Tricor Tempermeter [Tricor Instruments, Elgin, Ill.] which in its standard embodiment, determines chocolate temper during a 5 minute controlled cooling test. Specifically, the Tricor Tempermeter detects and measures an inflection point in a temperature versus time curve or trace. The units of temper, using the Tricor Tempermeter, may be expressed as chocolate temper units (CTU) and/or as a slope measurement. CTU measurements can be expressed in either Fahrenheit or Celsius temperature scale terms. All CTU measurements herein referred to herein are in the Fahrenheit scale, unless otherwise specified. Fahrenheit CTU measurements can be converted to Celsius scale by dividing by a factor of 1.8. Higher CTU values and lower slope values correspond with higher levels of temper. If there is no detectable inflection in the 5 minute trace, the chocolate would typically be assessed as having no temper.

18. The term "low temper" refers to temper which cannot be detected, i.e., no inflection, with a Tricor Tempermeter during a 5 minute trace, but which can be measured with a Tricor Tempermeter which has been modified to perform a 9.5 minute trace. The units of measurement are the same as used for the measure of "temper". If there is no detectable inflection in the 9.5 minute trace, i.e., the longest test time currently available with a Tricor unit, the chocolate would by necessity be assessed as having no temper, whereas it is believed that there is no commercially available instrument with a lower limit of detection.

Chocolate temper levels may be measured with a Tricor Tempermeter which characterizes the thermal properties of a chocolate subjected to a controlled cooling regime. This technique measures an inflection point in the cooling curve or trace and uses this data to produce a value for the temper level of a chocolate, expressed in Chocolate Temper Units (CTU) and as a slope value for the inflection. Higher CTU values and lower slope values correspond to higher levels of chocolate temper.

The Tricor Tempermeter is typically run using a 5 minute test period to produce the cooling trace for the temper determination. If a chocolate does not show an inflection during the 5 minute run, it would typically be described as having no temper. However, with a modification of the tempermeter to extend the cooling period to 9.5 minutes, it is possible to detect temper, i.e., an inflection point, in some samples which did not register any temper in the 5 minute trace. Temper detectable in a 9.5 minute trace, but not in a 5 minute trace is defined as "low temper". If a chocolate does not show an inflection point during a 9.5 minute trace it would then be described as having no temper, however, it is still possible for such chocolates to have some temper.

To measure temper levels below this limit, a method was developed using a rotational rheometer, in this case a Carri-Med Controlled Stress Rheometer Model CSL 500. By performing controlled cooling and shearing tests it is possible to compare the onset temperature of crystallization for chocolate with no inflection in a 9.5 minute trace to the onset temperature for the same chocolate which has been de-tempered through heating prior to analysis to ensure a true no temper condition. This difference in onset temperature is defined as a Rheological Temper Unit (RTU). The range of temper between truly no temper chocolate and the lowest level measurable in a 9.5 minute trace with a Tricor Tempermeter is defined as ultra-low temper. A more detailed description of the technique is given below.

19. The term "ultra-low temper" refers to temper which cannot be detected, i.e., no inflection, with a Tricor Tempermeter during a 9.5 minute trace, but which can be measured using a more sensitive rheological measuring technique as discussed further below. Ultra-low temper is expressed in rheological temper units (RTU).

Figure 2:
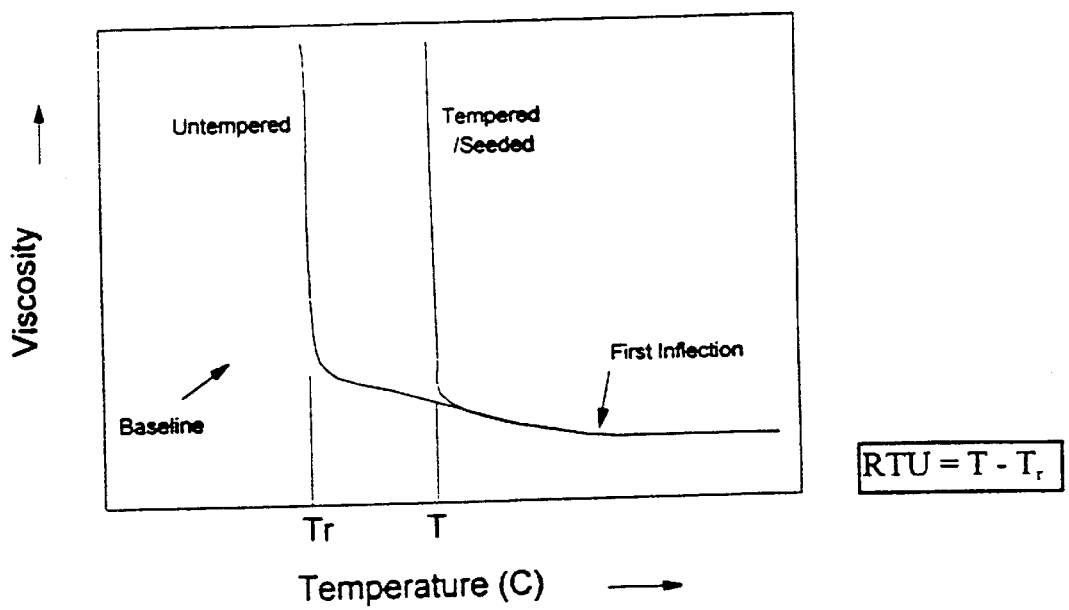
FIG. 2 is a graphical representation of a viscosity-temperature profile for illustrating a method of measuring temper values using rheological temper units (RTU) wherein the vertical axis represents viscosity and the horizontal axis represents temperature.

A Carri-Med Controlled Stress Rheometer can be employed to determine ultra-low temper levels using a 4 cm–2 degree cone and plate configuration. The chocolate sample is loaded onto the rheometer plate at the temperature of the ultra-low temper chocolate sample, for example at 28° C. The sample is then cooled from 28° C. to 14° C. at a rate of $-1°$ C./min while being sheared at a rate of 5 $sec^{-1}$. A viscosity versus temperature curve is recorded until the viscosity begins to increase exponentially. Next, a similar test is run using the same chocolate sample which has been detempered by heating to 55°C. for 30 minutes prior to analysis. The onset temperatures for the exponential increases in viscosity are then determined by extrapolating the baseline and exponential portions of the curves to the point of intersection. The onset temperature for the ultra-low tempered sample is shown as T in FIG. 2. The onset temperature for the detempered unstirred chocolate sample is defined as the reference temperature and is shown as Tr in FIG. 2. From this data, a Rheological Temper Unit, or RTU is defined as the difference between the sample onset and the reference onset temperatures.

$$RTU=T-Tr$$

For chocolate samples tempered with seeding agents, the chocolate sample should be loaded onto the rheometer at the seed addition temperature. The temperature should then be lowered quickly to 28° C. to start the cooling test. For example, the lowering of the temperature should be carried out within about 20 seconds.

20. Viscosity.

Chocolate displays non-Newtonian rheology and cannot be totally characterized by a single rheological measurement point. Despite this, apparent viscosity is a simple measure of viscosity useful for the evaluation of tempered and untempered chocolates and their suitability for operations such as enrobing and molding. The measurement of apparent viscosity can be accomplished by many methods. The method used herein for apparent viscosity measurements is as follows: The chocolate is maintained at the desired measurement temperature. The viscosity is measured using a Brookfield viscometer Model RV equipped with a "B" size T-spindle (approximately 36.4 mm cross-bar) and operating at 4 RPM. The spindle is immersed in the chocolate to be measured and allowed to rotate three times. The reading is taken after the third rotation and multiplied by 1000. The resultant value is the apparent viscosity in centipoise.

DETAILED DESCRIPTION OF THE INVENTION

Figure 3:
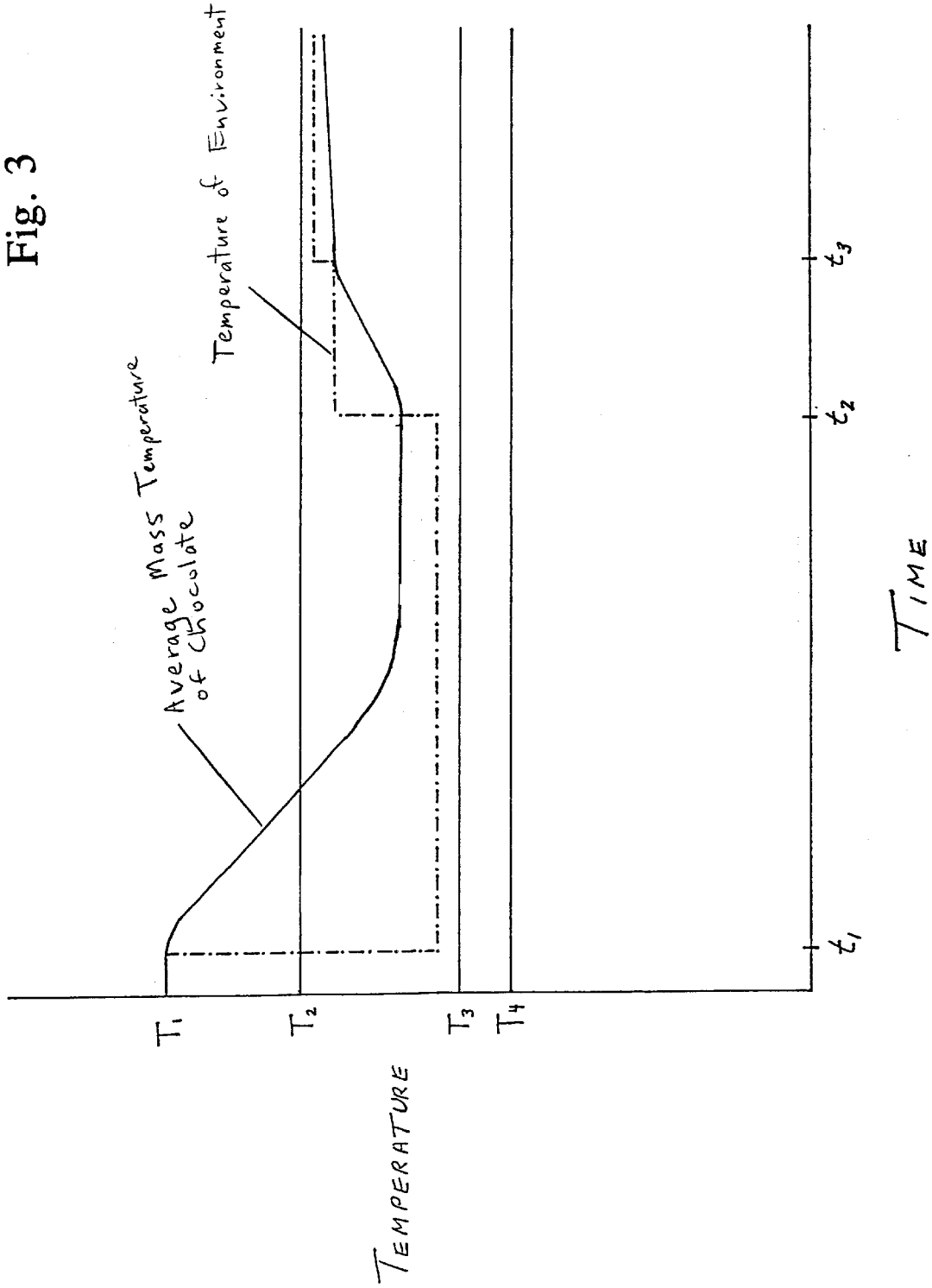
FIG. 3 is a graphical representation of a typical time-temperature profile of a conventional chocolate cooling process wherein the horizontal axis represents time and the vertical axis represents temperature.
Figure 4:
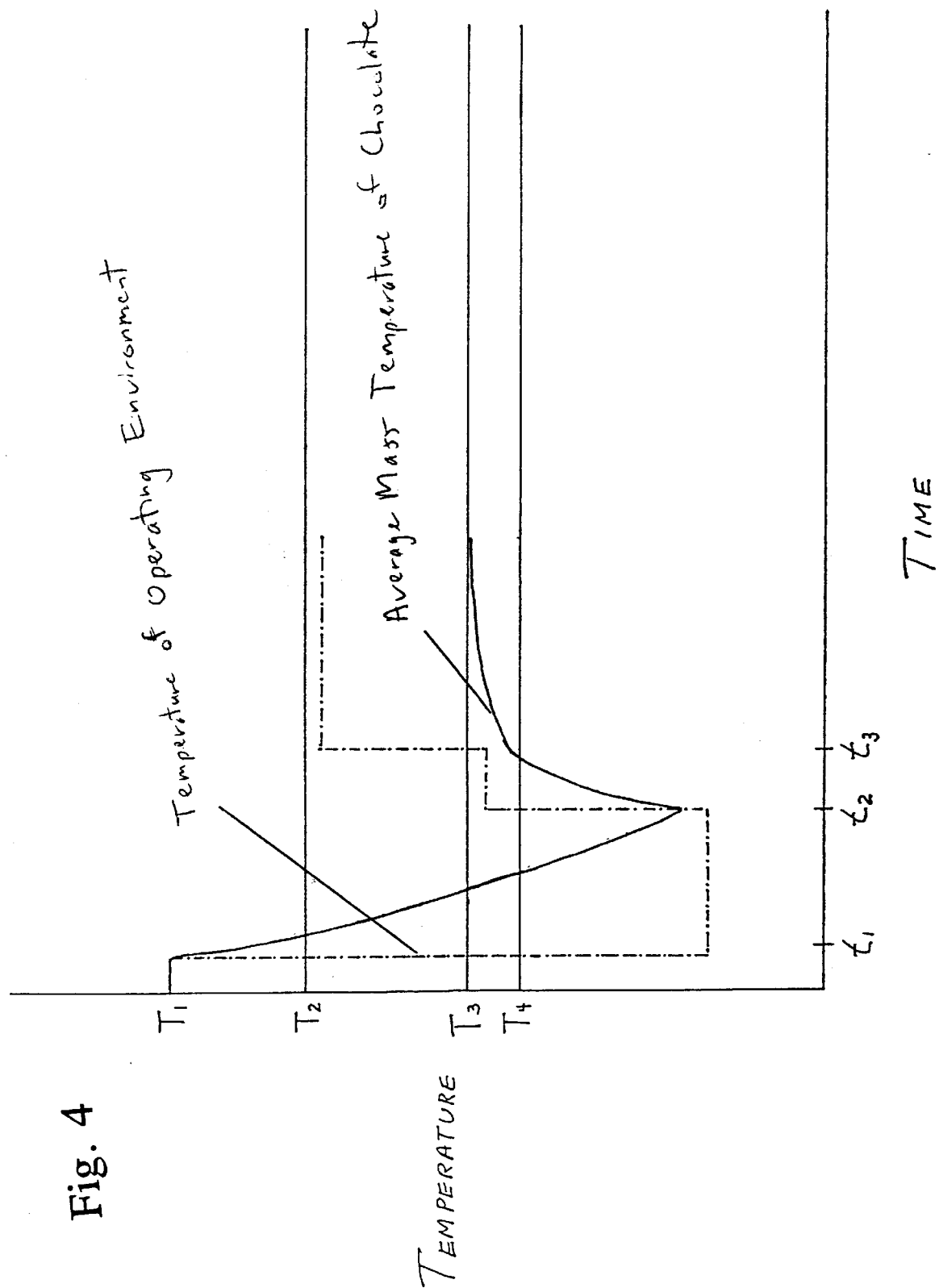
FIG. 4 is a graphical representation of a time-temperature profile of chocolate processed according to one embodiment of the invention wherein the horizontal axis represents time and the vertical axis represents temperature.
Figure 5:
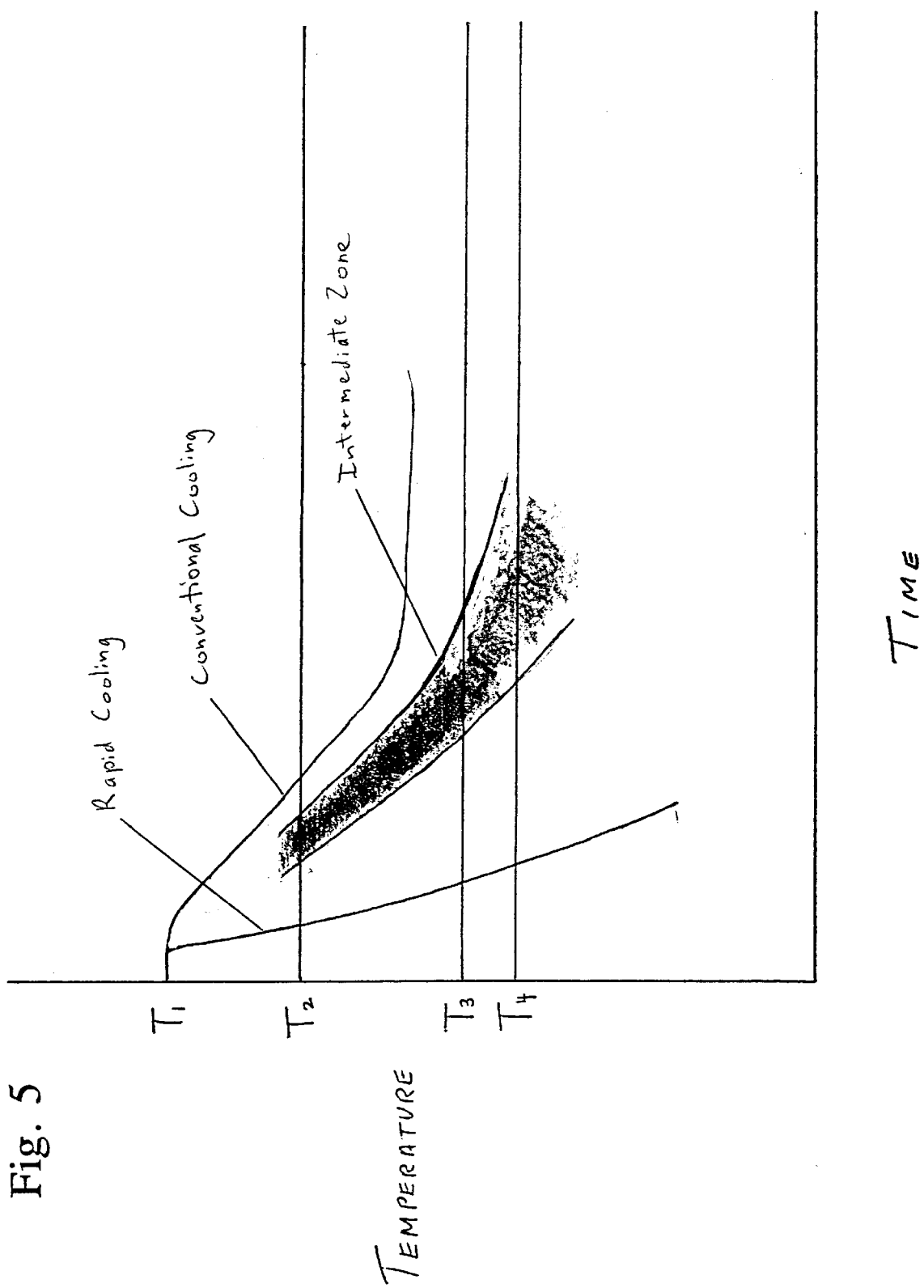
FIG. 5 is a graphical representation of a time-temperature profile of a chocolate process with an intermediate zone wherein the horizontal axis represents time and the vertical axis represents temperature.

The present invention relates to methods of setting chocolate compositions using rapid cooling. According to the one embodiment of the invention, a chocolate containing a liquid fat phase is rapidly cooled to a temperature below the solidification temperature over a period of time substantially less than conventional cooling times. Comparing the time-temperature profiles of FIGS. 3–5 illustrates the differences between conventional cooling processes and the rapid cooling processes according to the invention. The solid line is that of the average mass temperature of the chocolate, whereas the dotted line is the temperature of the environment the chocolate is being subjected. $T_1$ is the enrobing chocolate temperature. $T_2$ to $T_3$ is the temperature range for optimum crystal growth. $T_4$ is the dewpoint of air in the wrapping room. FIG. 3 shows the relatively gentle cooling step of a conventional cooling method where the chocolate is cooled slowly to a relatively mild temperature. The chocolate enters the cooling tunnel at time $t_1$ and enters the rewarm zone at $t_2$. The chocolate emerges from the rewarm zone at $t_3$ (i.e., ready for wrapping). The slope of the cooling curve of the average bulk chocolate temperature indicates the low cooling rates achieved through the use of low heat transfer rates. The object of the cooling in a conventional process is to solidify predominately through stable crystal growth which is achieved by bringing the chocolate temperature to the temperature level that optimizes crystal growth.

FIG. 4 illustrates one embodiment of the present invention using a chocolate that is equivalent to the chocolate processed by the conventional method as shown in FIG. 3. The time-temperature profile of FIG. 4 shows a much steeper cooling curve and goes to a much lower temperature compared with the conventional cooling method. The slope of the plot, i.e., the rate of cooling, is primarily dependent upon the temperature differential (the difference between the temperature of the chocolate and the cooling environment) in combination with the convective heat transfer coefficient. As can be seen by comparing the plot of the cooling environment and the plot of the average bulk temperature of the chocolate, the chocolate does not necessarily reach the coolest temperature in the cooling tunnel or the warmest temperatures in the rewarm zone. The operating temperatures are used in combination with the convective heat transfer coefficient to derive the desired rates of cooling and warming.

As can be seen in comparing FIGS. 3 and 4, the present invention accomplishes the setting of the chocolate in a much shorter prior of time.

Figure 6:
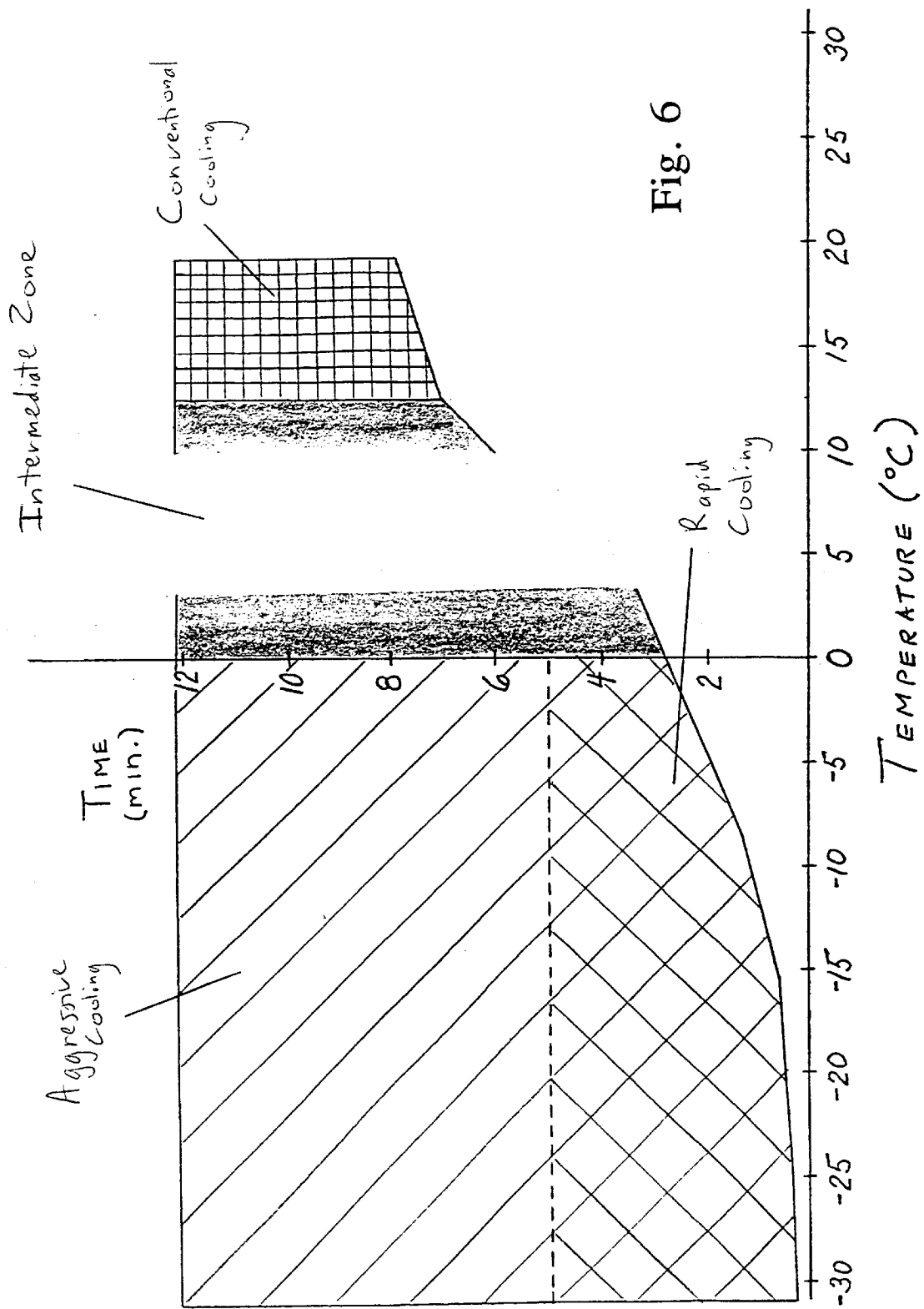
FIG. 6 is a graphical representation of chocolate cooling methods defined in terms of time/temperature process parameters wherein the horizontal axis represents time and the vertical axis represents temperature.

FIG. 5 illustrates a range of temperature-time profiles of other comparative methods that fall within a time/temperature/H-value regime herein referred to as the "Intermediate Zone". It has been discovered that between conventional and rapid cooling conditions there is indeed a range of conditions ("Intermediate Zone"), which varies depending on the composition of the chocolate, in which it is impossible or very difficult to manufacture glossy chocolate. Depending on the chocolate composition (particularly fat content), there is a certain range of processing parameters including cooling rate, cooling time and cooling temperature which will result in a poor finished product. FIG. 6 illustrates, by way of a Time/Temperature graph, the various cooling regimes for a given chocolate composition. The "aggressive cooling regime" includes methods that involve the use of the high heat transfer rates of the invention, but for a longer period of time. All other parameters being equal, there is a range of cooling temperatures ("the Intermediate Zone") that will result in a poor quality product. Either increasing the cooling temperature into the "conventional processing" regime or decreasing the temperature into the "rapid cooling regime will improve the quality of the resultant product. It is the poor characteristics that result when processing chocolate in the intermediate zone that are believed to have caused previous chocolatiers to believe that using colder and faster cooling regimes could not produce an acceptable product. Surprisingly, it has been discovered that moving the cooling parameters past the intermediate regime into colder temperatures and/or more aggressive cooling conditions provides chocolate products that are not only acceptable, but are in fact better than conventionally processed chocolate in several significant ways.

It is believed the use of a more vigorous cooling regime results in an alteration of the crystallization process that occurs during the cooling of the chocolate. Crystallization of any substance takes place as a result of two mechanisms, nucleation and crystal growth. Nucleation involves the initial formation of tiny embryonic crystals referred to as nuclei. Crystal growth is the development of the nuclei into larger crystals. Referring to fat crystallization, crystal growth involves the diffusion of triglycerides from the bulk solution and subsequent incorporation into the crystal lattice structure of an existing crystal or nucleus.

The rate of nucleation increases with the degree of super-cooling (i.e., with decreasing temperature), which is the energetic driving force for the phase change. The rate of crystal growth, on the other hand, is also related to molecular mobility (i.e., kinetic energy) and therefore can increase with increasing temperatures achieving a maximum rate of growth at temperatures just below the melting point of the crystal being formed. Therefore the cooling conditions used to "set" chocolate will dictate both the number of nucleation sites created as well as their rate of growth. The interaction of these two modes of crystallization determines the structure and stability of the fat phase in chocolate. It is believed that this defines the performance and acceptability of the chocolate and its characteristics including bloom resistance, gloss appearance and snap.

Conventional cooling of tempered chocolate can be considered to operate through a crystal growth mechanism where crystallization is taking place at a number of nuclei sites which have been generated through tempering and grown in size. The cooling tunnel operating temperature range of 10–20° C. provides a driving force for crystallization (through undercooling), but because the actual rate of cooling observed by the chocolate (given the relatively low heat transfer rates used) is low, the conditions favor crystal growth. In this way, the sufficient solidification of the chocolate that must be achieved requires a minimum time of approximately seven minutes. "The 7–12 minute residence time at controlled, low temperatures is sufficient to cause the majority of the cocoa butter (and butter fat if milk chocolate) an opportunity to crystallize, but significant liquid fat remains". See, "It Ain't Over Until . . . : A review of Post Cooling Tunnel Changes in the Cocoa Butter Phase of Chocolate" by Edward S. Seguire of Guittard Chocolate Co. (June 1995) *The Manufacturing Confectioner,* presented at the Penn. Manufacturing Confectioner's Association 49th Annual Conference.

It is believed that the implication of using the crystal growth mechanism as the dominant mode to set chocolate (as in conventional cooling) is that the process is reliant upon the ability to provide chocolate consistently within a specific range of temper. Conventional cooling tunnels are limited in their operating range and typically require long cooling times. Instead of providing a potential source of process flexibility, conventional cooling tunnels limit the operation of practically the entire chocolate processing line to a limited range of conditions.

The most critical region of a conventional cooling tunnel is believed to be the first leg, where rapid "stable" crystal growth is occurring. The second leg generally operates at colder temperatures than the first, and it may be considered as providing a slightly stronger driving force to encourage further solidification of the chocolate. The optional third cooling zone (when present) herein referred to as a "rewarm zone") is usually operated at warmer temperatures than the second to ensure that the bars enter the wrapping room with surface temperatures higher than the dew point of the environment. The resulting set structure preferably contains a high proportion of the cocoa butter in the stable Form V, with lesser though still significant amounts of less stable crystals and liquid fat.

It has been discovered that rapid cooling of tempered chocolate results in a crystallization mechanism which is predominantly nucleation mediated, followed by crystal growth at an extremely large number sites generated by both instantaneous nucleation and from tempering. The high level of undercooling resulting from the use of low operating temperatures below 0° C. (preferably below approximately −5° C.) and the use of high heat transfer coefficients (preferably greater than 30 W/m$^2$°C.) provides aggressive conditions. It is believed that these aggressive cooling conditions provide a very large driving force for crystallization that cannot be satiated through crystal growth alone. As a consequence, it is believed the solidification takes place by both crystal growth and instantaneous nucleation. In this way solidification of the chocolate can be accomplished in much shorter period of time (preferably within 1.0 to 3.5 min.) depending upon chocolate recipe, temper, chocolate thickness, cooling tunnel temperature and the convective heat transfer coefficient of the cooling environment.

As a result, the fat matrix formed by rapid cooling is believed to be comprised of a larger number of very small crystals, and is a mixture of stable Form V and unstable Forms II, III and IV, with very little liquid fat content. The properties and characteristics of the rapidly cooled chocolate product, discussed further below, confirm the belief that the resultant fat crystalline matrix comprises crystals that may be significantly smaller than the fat crystals formed using conventional methods.

Upon exiting the rapid cooling tunnel the chocolate slowly warms and further hardens in the post-cooling environment. The relative warmth of the wrapping room and/or small rewarm zone results in increased molecular mobility, enabling both the transformation of unstable crystals through to stable forms V and secondary crystal growth. Secondary crystal growth is the growth of energetically more stable crystals through the sacrificial destruction of surrounding less stable crystals and can be controlled to occur without undue softening of the chocolate.

In instances where the chocolate is either insufficiently cooled or warmed too quickly (or both), then a temporary softening of the coating is observed followed rapidly (in a matter of minutes) by an increase in hardness.

Unlike conventional cooling, the rapid cooling process operates over a wider range of cooling conditions. It has been shown to be stable in its performance across a range of temperature (10° C. and colder), heat transfer coefficient (30 to 130 W/m²°C. and higher) and residence time conditions (less than 1.0 minutes to greater than five minutes). Furthermore it has been shown to operate with a far greater tolerance of temper variation. In fact, rapid cooling has been shown to be capable of even producing satisfactory product from chocolate with low and even ultra-low levels of temper which are not detectable when measured by commercially available temper measuring devices.

According to one embodiment of the invention, the cooling tunnel used for the invention will be colder and/or provide higher heat transfer rates and thus cool the chocolate more rapidly. Instead of the conventional greater than 7 minutes period of cooling time, the rapid cooling of the invention would preferably result in the setting of chocolate in less than 1.5 to minutes. Table I shows a comparison between a conventional cooling method and the inventive rapid cooling method according to one embodiment of the invention.

TABLE I

| CONDITION | CONVENTIONAL PROCESS | ONE EMBODIMENT OF THE INVENTION |
|---|---|---|
| Temper (CTU/Slope) | 7.0/−0.5 | 4.0/+0.2 |
| Cooling Temperature (° C.) | 18–13 | −20 |
| Cooling Time (min.) | >7.5 | 2 |
| Cooling H Value (W/m² · ° C.) | 35 | 100 |
| Rewarm Temperature (° C.) | — | 10 |
| Rewarm Time (min.) | — | 0.5 |
| Rewarm H Value (W/m² · ° C.) | — | 90 |

As can be seen from Table I, the inventive methods use much more rigorous cooling conditions compared with the conventional method. Although conventional methods sometimes include a rewarm treatment, this is often not necessary since the surfaces of the conventionally cooled chocolates are not as cold as the surfaces of the chocolates cooled according to the invention.

The cooling of chocolate is typically achieved using a combination of radiation, convection and conduction. The cooling according to the invention is predominately achieved using convection, rather than conduction. That is, the high heat transfer rate is preferably not achieved using a chilled mold or chilled plunger, but is instead achieved by convection of heat from the chocolate in a cooling tunnel, for example. The invention is intended to include not only convection achieved using a gaseous medium, but also cooling achieved using a coolant material such as liquid nitrogen or $CO_2$. This allows for the rapid cooling of non-molded products such as enrobed candies, chocolate deposits, etc. However, the use of high convective heat transfer coefficients and/or cold temperatures would also be useful for cooling molds.

As set forth above, unlike conventional cooling, the rapid cooling process operates over a wider range of cooling conditions. It has been shown to provide chocolates across a wide range of temperatures (10° and colder, preferably −5° C. or colder), heat transfer rates (30 to 130 W/m²°C. and higher) and residence time conditions (from 5 minutes down to seconds). The optimal process parameters for rapid cooling depend upon a number of factors including the chocolate composition being cooled. The fat content of the chocolate, for example, can influence process parameters. The temperature boundary between the unacceptable "intermediate zone conditions" and the operable rapid cooling conditions is believed to increase with increasing fat content. As an example, a 25 wt % fat chocolate composition may form a dull finished product using a cooling temperature of 8° C., whereas a 35 wt % fat may form an acceptable product using the same processing conditions.

The present invention results in a set product that contains stable fat crystals in the fat phase of the composition. Since the chocolate is typically kept or stored at room temperature, any unstable fat crystals will readily transform to the more thermodynamically stable phases. In contrast, chocolate compositions (typically non-standardized chocolate) are sometimes directly applied onto a frozen product (i.e., ice cream) to form a chocolate enrobed product. These chocolates do not form compositions wherein substantially all the fat is in the stable form since the product is kept frozen and therefore the unstable fat crystals do not transform into the stable forms. In fact, unlike confections stored at room temperature or ambient conditions, the chocolate coatings on such frozen products are intended to primarily contain unstable fat crystals to deliver a chocolate composition with low temperature melting characteristics, complimentary to frozen fillings such as ice cream. See PCT WO 94/07375 to Cebula, page 3, lines 11–12.

Therefore, the inventive method preferably results in a set chocolate comprising stable fat crystals and unstable fat crystals. That is, the set chocolate should comprise a fat matrix containing fat crystals of the polymorph Form V, Form VI or mixtures thereof. Preferably, the set chocolate results in a finished confection as delivered to the consumer with substantially the same melt profile as a conventionally processed chocolate confection.

One aspect of the invention relates a method of producing a chocolate confection containing a temperable fat material without the use of a mold comprising the step of cooling a tempered chocolate composition having a liquid fat phase in a cooling environment having an operating temperature less than 0° C. to solidify at least a portion of the liquid fat phase to form a set or partially set chocolate confection comprising stable fat crystals. Although the set chocolate may also contain unstable fat crystals (i.e., Forms I through IV) or even liquid fat, these portions will preferably transform into the stable fat phases over a period of time.

Another embodiment of the invention relates to a method of producing a chocolate confection containing a temperable fat material without the use of a mold comprising the step of cooling a tempered chocolate composition having a liquid fat phase in an initial cooling environment having an average convective heat transfer coefficient greater than about 50 W/m²°C. or lower, alternatively, lower if very low operating temperatures are used.

Yet another embodiment of the invention relates to a method of producing a chocolate confection containing a temperable fat material without the use of a mold comprising the step of cooling a tempered chocolate composition having a liquid fat phase in a cooling environment at a sufficiently high enough cooling rate so that the cooling profile does not pass through the Intermediate Zone to form a cooled chocolate confection containing unstable fat crystals and stable fat crystals.

Preferably, the above-described embodiments of the invention also result in a bloom stable chocolate confection.

Moreover, the above embodiments of the invention preferably also provide a chocolate confection having at least one glossy surface. Since the bottom surface portion of the chocolate is typically in contact with the conveyor belt during cooling, it is the top and side portions of the product that preferably have the improved gloss appearance since it is the side and top portions that are exposed to the high convective heat transfer coefficients and/or low operating temperatures.

The rapid cooling according to the invention may occur in a cooling tunnel or any other suitable apparatus for cooling the chocolate as long as the apparatus or system is capable of providing the operating conditions within the rapid cooling regime.

According to one aspect of the invention, very high convective heat transfer rates are used to effect a rapid cooling. This is achieved using a combination of a large temperature differential between the chocolate and the low temperature cooling environment to provide a driving force for heat transfer and/or high convective heat transfer coefficients to increase the rate at which the heat transfer takes place. The convective heat transfer coefficient (herein "H value") depends on a variety of factors including air velocity, type of gas, and geometries of system (i.e., geometry of cooling chamber, product being cooled, direction of air velocity, etc.). The H value is most closely dependent upon the air velocity of the gas over the surface of the product. Moreover, the invention is not limited to those methods which regulate the H value specifically, but rather relates to methods involving the use of aggressive cooling by convection.

There are many well known methods and devices for measuring the H value. Suitable methods and devices include those set forth in European Patent publication 0 517 496, GB 2 265 460 and GB 2 222 255. Another suitable apparatus includes the Scorpion manufactured by Flyde Thermal Engineering Limited of the United Kingdom. The skilled artisan could either purchase a suitable H value measuring device from a commercial vendor or design an individual device for use in a specific cooling tunnel.

Preferably, the chocolate is cooled using a convective heat transfer coefficient above about 50 W/m²°C., advantageously greater than about 70 W/m²°C., even better greater than about 80 W/m²°C. and most preferred greater than 90 W/m²°C. Even higher coefficients such as greater than about 100 W/m²°C., greater than about 110 W/m²°C., greater than about 120 W/m²°C. can be used.

The rapid cooling is preferably from a temperature proximate to the melting temperature of the fat phase to a temperature below the solidification temperature of the fat phase. Preferably, the rapid cooling is from a temperature above about 30° C. or the melting temperature of the fat phase of the chocolate composition using a cooling environment having a temperature below about 0° C., advantageously less than −5° C., even better less than −10° C. and most preferred less than −15° C. Even lower temperatures such as below −20° C., below −25° C. and even below −30° C. may be used to produce products having even further improved properties.

The cooling temperatures and convective heat transfer coefficients can vary depending on the chocolate composition being set. Some chocolates can be set using setting or solidification temperatures as high as 10° C. with convective heat transfer coefficients below 50 W/m²°C. and form acceptable products while other chocolate compositions require lower temperatures and/or higher convective heat transfer coefficients. That is, it is believed the intermediate zone described above varies depending on the composition of the chocolate and the geometries (i.e., thickness, etc.) of the confectionery products. For example, a chocolate composition containing 50% by weight fat can be processed using less severe cooling conditions (i.e., higher solidification temperatures and/or lower convective heat transfer coefficients) and form an acceptable product compared to a chocolate having 25% by weight fat. It is believed that the contractile forces (discussed further below) of the fat in the 50% by weight fat chocolate would have a reduced detrimental effect on gloss since even if some fat is withdrawn from the surface, there still remains a sufficient amount at the surface to maintain a glossy surface. In contrast, the contractual forces would have a more severe effect on the lower fat chocolate since very little fat has to be pulled away from the surface to result in a discontinuous fat layer at the surface. See, "Some Thoughts on the Gloss of Chocolates" by J. Koch, Confectionery Production, May 1978, page 182.

According to another embodiment, the rapid cooling occurs in a period of time substantially less than the cooling time of conventional methods. Preferably, the cooling time is less than 5 minutes, advantageously less than 4 minutes, even better less than 3 minutes and most preferred less than 2 minutes. Shorter cooling times such as less than 1.5 minutes or even less than 1 minute may be used with suitable cooling systems. The cooling time necessary to form an acceptable product will also depend on the composition of the chocolate as well as its dimensions. For example, the period of time necessary to adequately cool any given chocolate will depend upon the thickness of the chocolate. The thicker the chocolate enrobed coating, for example, the longer the cooling time necessary to provide the same level of setting all other things being the same.

According to one embodiment, the rapid cooling is achieved using gases in a cooling environment to deliver high convective heat transfer coefficients. Suitable gases include air, $CO_2$, $N_2$, He, Ar, or mixtures thereof.

According to another preferred embodiment, the melted chocolate composition is first enrobed onto an edible product and subsequently rapidly cooled to form a set chocolate coating.

Alternatively, the chocolate composition is deposited onto a conveyor belt or tray or the like and transported into the rapid cooling zone. If desired, the set chocolate can be subsequently cut into blocks or any desired shape.

Using the present invention, chocolate confections having unique advantageous characteristics are produced. The improved properties may include increased resistance to bloom, enhanced gloss, better hardness, reduced fat and better decoration and shape retention.

One advantage of the invention is the ability to produce bloom stable chocolate confections or even products with enhanced bloom resistance. Fat bloom is characterized by the formation of non-uniform whitish spots and/or streaky gray-white finish on the outer surface of a chocolate. The fat deposits that cause fat bloom often resemble mold and/or give the chocolate an old appearance. Fat bloom can greatly diminish consumer appeal for the confectionery product.

Fat bloom is the detrimental growth of fat crystals on to the surface of the chocolate to the point that they are large enough to be visible. The degree of blooming is related to the mobility of fat molecules, which is strongly influenced by the polymorphic characteristics of the crystallized fat phase and the temperature.

Bloom on chocolate has been the subject of much argument about its cause, composition, and prevention. There are actually two types of bloom. The first is referred to as "fat bloom" and arises from changes in the fat in the chocolate. With fat bloom, portions of the fat in the chocolate melt and migrate to the surface causing whitish-grayish deposits of re-crystallized fat on the surface. This can result from either (1) thermal cycling or thermal stressing giving heat damage derived bloom or (2) from a combination of inadequate tempering or crystallization during cooling or inappropriate storage yielding fat bloom commonly referred to as cold or gray bloom. The second is "sugar bloom" which is formed by the action of moisture on the sugar ingredients. With sugar bloom, it is the sugar that dissolves and migrates to the surface and then recrystallizes to form white deposits.

Although both fat and sugar bloom diminish the appearance of the chocolate often making the chocolate look old or moldy, it does not harm its eating qualities unless there have been very bad storage conditions. In such cases, the chocolate may have a stale taste. If the bloomed chocolate has been exposed to excessive dampness, surface mold can develop.

As set forth above, fat bloom is recognized as a whitish-grayish coating on the surface of chocolate. It tends to be more visible on dark chocolate because of its light color. When touched lightly with the finger, it has a greasy appearance and is easily removed with rubbing and/or scratching. Under the microscope minute fat crystals are visible. Fat bloom is believed to be typically caused by:

1. Bad tempering during processing
2. Incorrect cooling methods, including covering cold centers, or insufficient crystallization during cooling.
3. The presence of soft fat in the centers of chocolate-covered units.
4. Warm storage conditions and/or thermal cycling.
5. The addition to chocolate of fats incompatible with cocoa butter.
6. Abrasion and finger marking, particular under warm conditions.

As discussed earlier, it was also believed that severe or aggressive chocolate cooling conditions, which results in the formation of a chocolate containing unstable fat crystals, would produce a chocolate product being prone to dulling and/or a propensity to bloom. Moreover, it was also believed that incomplete tempering, i.e., low temper and ultra low temper, results in a chocolate prone to fat bloom. As a result, prior chocolatiers avoided the severe and/or aggressive chocolate cooling conditions and incomplete tempering, i.e., low or ultra low temper levels.

The surprising observation that rapid cooling imparts enhanced bloom resistance has been consistently observed throughout the development of the present invention. It is believed the rapid cooling conveys a greater degree of bloom resistance because it results in a smaller mean crystal size than conventional cooling. It is hypothesized that the finer crystal lattice restricts the mobility of liquid fat and therefore impedes the movement of fat to the surface of the chocolate and/or that the composition of the fat crystals is more homogenous as a result of reduced triglyceride fractionation during cooling and storage. This fractionation has been implicated in bloom formation. See, D. M. Manning, P. S. Dimick (1985) *Food Microstructure* 4, 249. This may be due to the increased interaction between liquid and solid fat molecules that results from the larger crystal surface area provided by a finer crystal matrix.

It was previously believed that bloom is formed by the transition of the lower melting polymorphs to the stable forms (*Chocolate, Cocoa and Confectionery: Science and Technology* by Minifie, 3rd Edition, page 647). It is believed that although the present invention results in the formation of unstable fat crystals which subsequently transform into stable crystals, this transition is in an controlled manner. That is, the unstable fat crystals transform to the stable form directly without passing through the liquid phase or only passing through the liquid phase for a short period of time. The fat will only bloom if it melts into a liquid phase for a period of time sufficient to allow it to travel to the surface of the chocolate and solidifying as the stable or unstable form as bloom. Accordingly, by-passing the formation of liquid phase during the transformation from the unstable to stable polymorphs enhances bloom resistance.

Another advantage of the invention is the ability to produce a chocolate having the same or better gloss appearance as conventionally cooled confections. The gloss of a chocolate product is also very important for consumer acceptance. It is believed that gloss and bloom are closely related phenomena in that the dull chocolate product is really just a product with very slight bloom and that dullness results from very small fat crystals sticking out from the surface of the chocolate, scattering any incident light. This appears to be an appropriate explanation for when product becomes dull during rewarm or in storage after exiting the cooling tunnel.

However, an additional mechanism by which dull product can be generated applies to chocolate dullness that occurs in the cooling tunnel itself and can be observed both during the crystallization of the chocolate and when product exits the cooling tunnel. This phenomena is particularly apparent under specific cooling conditions that fall between the conventional cooling regimes and those of present invention (the "Intermediate Zone") and is believed to result from the poor dispersion behavior of chocolate. It is the poor characteristics that result when processing chocolate in the intermediate zone that may have caused previous chocolate processors to believe that using colder and faster cooling tunnels would be detrimental. Surprisingly, it has been discovered that moving the cooling parameters past the intermediate zone using colder temperatures and/or higher convective heat transfer coefficients provides chocolate products that are not only acceptable, but can in fact be better than conventionally processed chocolate in several significant ways.

It is believed that dullness may result from the retraction of fat away from the surface of the chocolate. See, "Some Thoughts on the Gloss of Chocolates" by J. Koch, *Confectionery Production,* May 1978, page 182. This is likely to be caused by a suction pressure or contractile forces generated within the chocolate through contraction of the fat phase as it cools and crystallizes. As the fat phase cools and crystallizes, the volume of the fat phase is reduced. This causes the retraction of liquid fat from the surface of the chocolate, causing the exposure of irregular cocoa and sugar particles at the surface. This results in a dull surface having a poor gloss appearance.

An interesting comparison can be made with molded chocolate products, which when properly processed are typically considered to be glossier than their enrobed counterparts. Although contraction of the fat phase occurs in molded chocolate (causing the release of the piece from the mold), the surface remains glossy. In the case of molding, it is believed that the wetting or adhesion strength resulting from the contact of the fat phase with the mold is sufficient to overcome the suction pressures or contractual forces and prevents fat retraction, leaving a dramatically glossy surface. This is supported when the gloss of the back of a molded piece that was not in contact with the mold is compared to that of the molded faces that were in contact with the molds.

Accordingly, the formation of glossy product may therefore hinge on somehow preventing the withdrawal of fat from the surface. It is believed rapid cooling achieves this by first solidifying the fat at the surface of the chocolate and/or increasing the viscosity of the fat at the surface sufficiently to overcome the subsequent contractile forces caused when the inner fat portions solidify.

Surprisingly, this theory of reduction of gloss has been supported by the discovery that the higher rates of cooling result in the chocolate confections having improved gloss appearance. Although, there have been samples produced by rapid cooling that have shown decreased gloss appearance under more rigorous cooling conditions, this was believed to have been caused by condensation of moisture on the colder surface of the chocolate. If the condensation of moisture onto the chocolate is eliminated, the use of colder conditions will result in a glossy product. The rapid cooling appears to solidify the surface fat first, before it experiences contractual forces from within the chocolate.

Accordingly, another aspect of the invention relates to the formation of a non-molded chocolate product formed by rapid surface solidification that approaches or even matches the gloss of glossy faces of molded products within the short cooling times of the invention. Preferably, the chocolate compositions may be enrobed onto an edible substrate and rapidly cooled to form an enrobed product having a gloss appearance comparable to a molded product. The gloss appearance of the inventive products can be significantly better than the identical chocolate composition cooled with the same temper level but using a conventional cooling step, i.e., cooling from 30° C. to 20° C. using a convective heat transfer coefficient between approximate 10 and 50 W/m²°C. and a coolant temperature no lower than approximately 10° C. over a period of time greater than 7.5 minutes. Preferably, the gloss of the inventive product is greater than 3% better than the conventional product, advantageously greater than 5% improved, even better than 10%, and most preferred greater than 15%.

Gloss can be measured in a variety of ways, preferably using a Tricor Glossmeter.

With rapid chocolate cooling it has been found that increasing the amount of temper results in an increasingly dull product, although the reason for this is not entirely clear. It is believed that the effect on gloss from increasing temper results either (1) from an increased rate of withdrawal of liquid fat away from the surface during cooling relieving the greater stresses within the cooling chocolate and/or (2) from the increase in the solid phase of the chocolate, which would logically result in an increase in the susceptibility to exposure of solids (rather than liquid fat) at the surface of the chocolate. See, "Some Thoughts on the Gloss of Chocolates" by J. Koch, *Confectionery Production,* May 1978, page 182. These results also reconfirm the observation that high H values improve gloss. As discussed above, this is believed to result from the rapid solidification of the fat on the surface of the chocolate.

It is also believed the use of a rewarm treatment with warmer temperatures results in the loss of gloss by excessive melting of the unstable crystals and the subsequent uncontrolled crystal growth on the surface. The results indicate that there is an optimum rewarm temperature of approximately 10° C., depending on the fats used in the chocolate.

Testing has indicated that the use of untempered (0 RTU) chocolate processed under currently practicable storage time and temperature conditions will develop gray bloom in all cases. Interestingly, that result can be considered to support the view that secondary nucleating (promoted by existing crystal centers) is a critical factor in the success of rapid cooling. If spontaneous nucleation were occurring independent of the presence of temper in the system, then the large difference in the susceptibility to cold bloom between completely untempered chocolate (0 RTU) and ultra-low tempered chocolate would not be observed. Thus, the gray bloom data indirectly supports the view that at least ultra-low temper levels are required for successful rapid cooling.

Testing has also indicated the following relating to thermal cycling bloom:

Rapid cooling of chocolate (low temperature and high H value) makes it more resistant to thermal cycling bloom Rapid rewarm (rewarm temperature>10° C.) makes a chocolate more susceptible to thermal cycling induced bloom Untempered 0 RTU chocolate is highly susceptible to thermal cycling bloom Improved hardness is another characteristic of the chocolate products made using the present invention. The initial hardness of a chocolate product exiting a cooling zone is a critical attribute in that it determines the wrapability of the piece. If the chocolate is too soft it may be subject to more machine damage or cause chocolate build-up on wrapping machine parts possibly resulting in the jamming of the wrapping machine.

The discovery that temper is a strong factor in determining chocolate hardness, particularly at warmer temperatures, indicates hardness which has been generated through stable crystal growth. More extreme cooling provided by lower temperatures (and higher H values) results in either nucleation or rapid crystal growth in an unstable form, which is therefore less dependent upon temper. However, testing clearly indicates that although hardness can be achieved without high temper levels; it is achieved more readily with higher temper levels. In addition, if the chocolate is at a low temperature e.g. −10 or −20° C. when exiting the cooling tunnel, it is likely that it will have an extremely high solid fat content—no matter how thermally unstable the fat matrix is.

It has been observed that rewarm temperatures up to 15° C. result in initially harder products. This is probably due to both secondary crystallization (growth or nucleation mediated) and polymorphic transformations that occur from increased molecular through warming—without providing excessive warmth that might result in softening of the chocolate through partial melting of the fat phase.

Upon exiting the rapid cooling tunnel, the chocolate slowly warms and hardens in the post-cooling environment. This rewarm results in increased molecular mobility, enabling both the transformation of both the unstable crystals through to stable Form V and secondary crystal growth. This is the growth of energetically more stable crystals through the sacrificial destruction of surrounding less stable crystals.

Another aspect of the invention relates to the improved products produced by rapid cooling. It is believed that the set chocolate formed using the present invention has a finer crystallized fat phase. This theory may be supported by the improved characteristics of the chocolate including potentially increased resistance to bloom, enhanced gloss and improved hardness. It is believed the resulting rapidly set structure is comprised of a large number of very small crystals and is a mixture of stable Form V and unstable Forms II, III and IV, with very little liquid fat content. Accordingly, one embodiment of the invention relates to a chocolate comprising a fat phase containing finer fat crystals.

Yet another aspect of the invention relates to the ability to provide high quality shaped or decorated products using rapid cooling. During conventional enrobing, for example, an edible center may be enrobed with chocolate and the top surface decorated prior to cooling. During conventional cooling, the solidification and/or hardening of the chocolate coating occurs slowly. As a result, the chocolate may still flow reducing and/or altering the shape of the decoration. Moreover, the chocolate coatings on the sides of the product may also run down causing a non-uniform thickness on the sides particularly the corners. Referring again to FIG. 7(*a*), which illustrates by exaggeration several of these problems. The thinned corners and wide feet caused by the unintended flow of the chocolate down the sides of the enrobed product sometimes results from the slow setting of the chocolate and/or poor control of rheology. The thinned corners and/or edges can be susceptible to cracking and expose the inner edible portion and/or reduce the barrier effect of the coating resulting in moisture loss and/or detrimental oxidation of the center. The wide feet result in a product having a non-uniform appearance and shape as well as wasted chocolate since the foot may partially fracture off during wrapping or afterward. Moreover, the wide feet make wrapping more difficult.

The rapid cooling according to the invention sets the coating, shape or decoration faster, better maintaining the chocolate form. As can be seen in FIG. 7(*b*), the enrobed product according to the invention has a more uniform thickness and is free of the defects shown in FIG. 7(*a*). This is yet another advantageous result of using rapid cooling according to the invention.

Figure 8A:
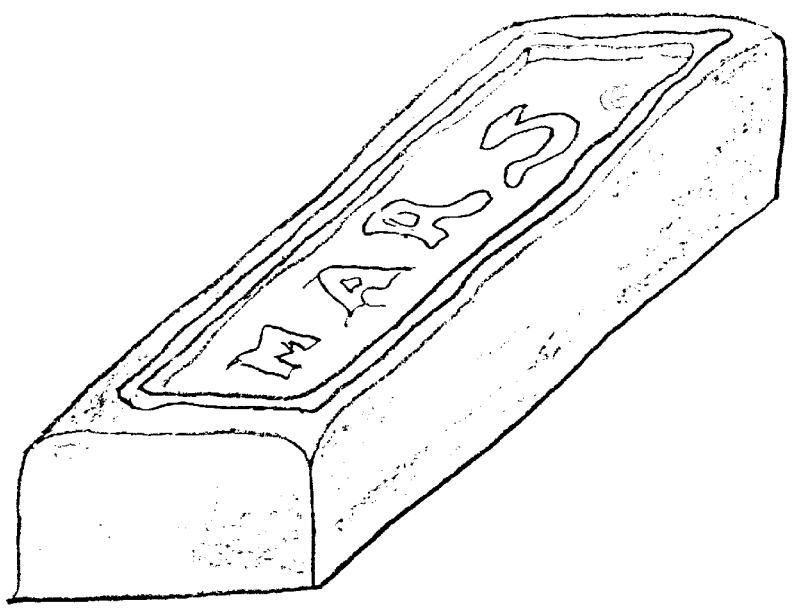
FIG. 8(a) is a top side elevational perspective view of a chocolate confection having an embossed image formed on a top surface made according to an embossing method without rapid cooling.
Figure 8B:
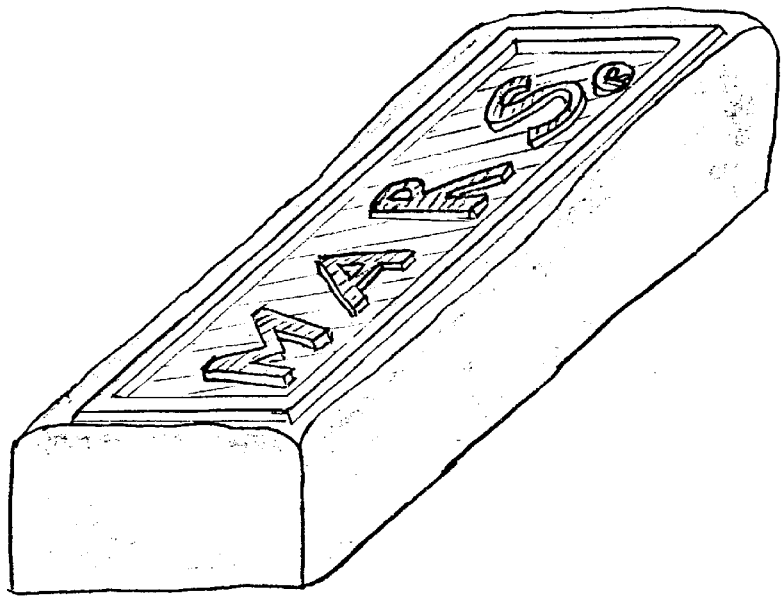
FIG. 8(b) is a top side elevation view of a chocolate confection having an improved embossed image formed on a top surface made according to a embossing method with rapid cooling according to one aspect of the invention.
Figure 10:
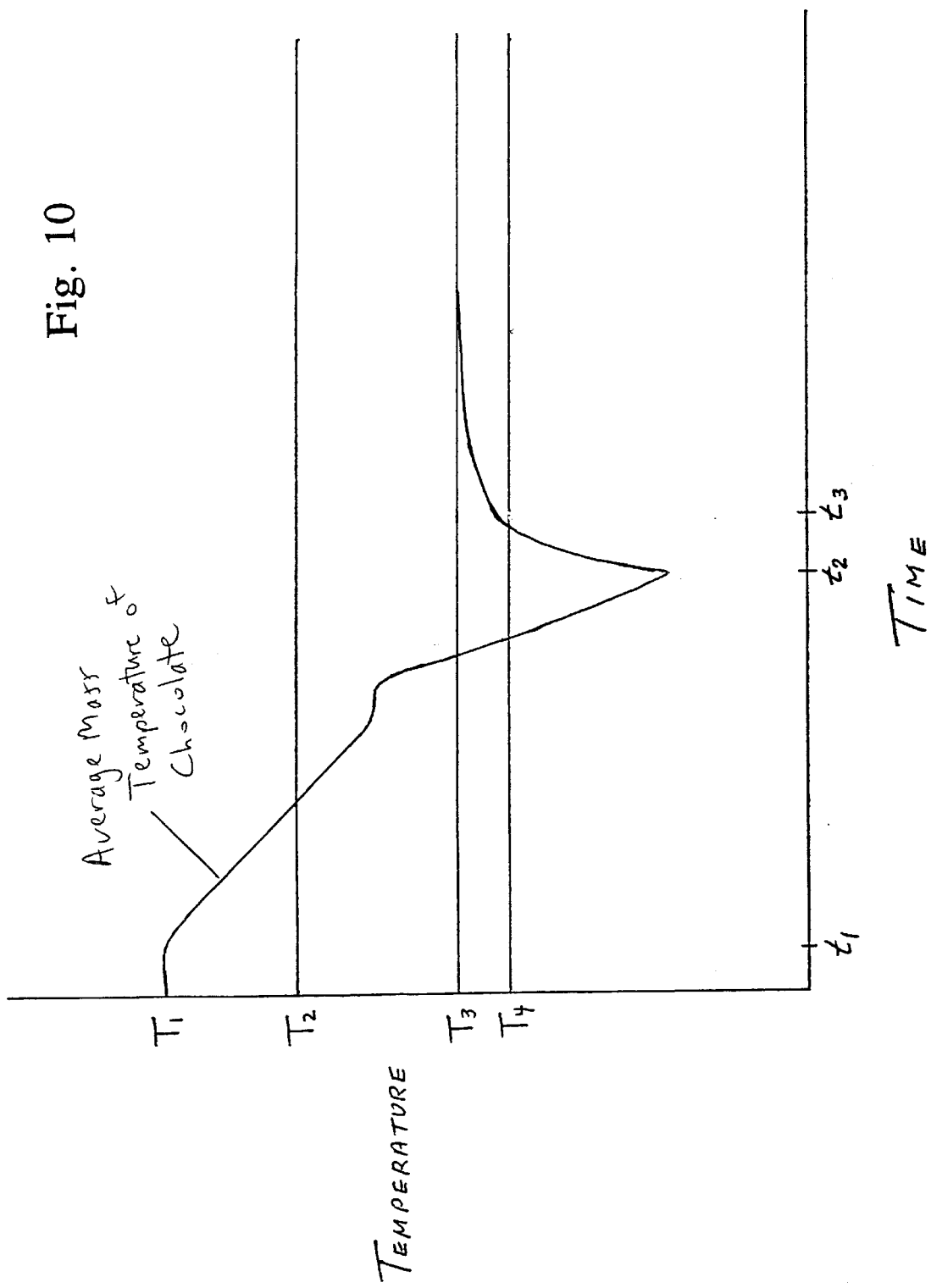
FIG. 10 is a graphical representation of a time-temperature profile of a chocolate processed according to yet another embodiment of the invention wherein the horizontal axis represents time and the vertical axis represents temperature.

FIGS. 8(*a*) and 8(*b*) illustrate the improvement in the retention of a detailed embossed decoration on the surface of an enrobed product produced, for example, by the methods set forth in U.S. application Ser. No. 08/782,901 entitled "Methods of Shaping or Embossing Chocolates with a Chilled Forming Device and Products Produced by Same" by Neil A. Willcocks, William Harding, Ralph D. Lee, Thomas M. Collins, Frank W. Earis and Steven D. Stephens, filed concurrently, now abandoned and herein incorporated by reference. FIG. 8(*a*) is a top view of a chocolate surface embossed with the lettering "MARS®" made by embossing the top surface of an enrobed product prior to setting by a conventional cooling method. FIG. 8(*b*) shows an embossed enrobed product similar to the product shown in FIG. 8(*a*) except that it was cooled rapidly according to one embodiment of the invention. As can be by comparing FIGS. 8(*a*) and 8(*b*), the slow cooling results in poor decoration retention, whereas the rapid cooling results in an improved setting of the embossed surface and excellent fine detail retention as a result of the rapid setting of at least the outer surface layer of the product.

Another aspect of the invention relates to the surprising and unexpected advantage of being able to use low or ultra-low temper chocolate. The tempering of chocolate results in the production of seed crystals of fat throughout the fat matrix. The development of fat seed crystals increases the viscosity of the system since there is a decrease in liquid phase and corresponding increase in solid phase (crystalline fat). Ultra-low temper has a low amount of fat crystals in the tempered chocolate. Using the present "rapid cooling" method of setting chocolate allows for the use of "ultra-low" temper chocolate. Since "ultra low" temper chocolate can be used (i.e., having reduced crystal seeding), there is not as much solid load in the dispersion. Less temper means less of an increase in viscosity for any given system. Accordingly, less fat is necessary to form the dispersion having the desired processing viscosity. This is a significant advantage since viscosity is strongly linked to processability.

Generally, chocolate used to coat or surround foods must be more fluid than chocolates used for solid chocolate bars or novelty shapes. Enrobing is accomplished when the chocolate is in a fluid state and a proper viscosity must be maintained in order to produce a satisfactory coated product. Since melted chocolate is a suspension of non-fat particles (e.g., sugar, milk powders and cocoa solids) in a continuous fat phase of cocoa butter and/or other fats, chocolate suspensions have non-Newtonian flow behavior. For Newtonian liquids (true liquids), flow begins as soon as force is applied. This is not the case for non-Newtonian fluids, which are suspensions of particles. A minimum threshold of force must be applied to toothpaste, for example, in order for it to flow. Below this threshold, no flow occurs. This minimum force is called the "yield value". "Plastic viscosity" approximates the work done to keep the suspension flowing uniformly. A variety of factors influence the flow properties of chocolates. These factors include fat content, emulsifier content, moisture content, particle size distribution, particle shape, temperature, conching time, temper, thixotropy and vibration.

The rheological behavior of chocolate is important for a variety of applications used in the manufacture of chocolate. The process of coating chocolate onto a food, for example, is known as enrobing. Enrobing is accomplished when the chocolate is in a fluid state. A proper yield value and viscosity must be maintained in order to produce a satisfactory coated product. Poor flow properties may result in an insufficient coating or the food center showing through the coating as well as several other defects. FIG. 7(*c*) illustrates some of the defects typically caused by poor control of rheology including surface pits caused by fractured air bubbles that were trapped during the setting of the chocolate, cracking and lack of uniform thickness.

To provide good flow properties, every particle dispersed in the chocolate suspension should be coated with a thin film of fat. It is important that fat covers the surface of all the solid particles; otherwise, uncoated surfaces will rub against each other, reducing flow. Accordingly, particle size distribution and particle shape plays a very important role in determining chocolate flow properties. If the particles are small, their specific surface area is great and, therefore, more fat is needed; conversely, if the particles are large, the specific surface area is small and less fat is needed. However, a chocolate is perceived as being coarse when a large percentage of the particles are large. Accordingly, most particles in chocolate are required to be smaller than 40 microns.

As stated above, the tempering of chocolate results in the production of seed crystals of fat throughout the fat matrix. Low or ultra-low temper simply means a reduced level of crystal seeding. It is believed conventional passive cooling results in a crystallization of the fat matrix by crystal growth, whereas rapid cooling crystallizes the matrix by nucleation of crystals. Crystal growth relies on the mobility of fat molecules to promote the growth of the fat seed crystals. Conversely, nucleation spontaneously occurs throughout the liquid fat phase and does not rely as much on the transfer of melt molecules. As a result, chocolates having lower temper levels can be processed since a higher level of crystal seeding is not necessary.

The ability to use low or ultra low temper allows reduced fat chocolates to be used in applications including enrobing, molding, etc., since the lower temper will provide lower viscosities. The advantageous use of low and ultra-low temper and methods of providing chocolates having these temper levels with seeding agents is described in U.S. patent application Ser. No. 08/782,903 entitled "Methods of Processing Chocolates at Low Viscosities and/or at Elevated Temperatures Using Seeding Agents and Products Produced By Same" by Neil A. Willcocks, Thomas M. Collins, Frank W. Earis, Ralph D. Lee, Arun V. Shastry, Kevin L. Rabinovitch and William Harding, filed concurrently herewith.

After cooling, the chocolate is preferably rewarmed in a rewarm zone. The purpose of a rewarm zone after the cooling zone is to eliminate moisture condensation on the chocolate in the wrapping room. A rewarm zone is sometimes used in conventional processing after the chocolate is set to avoid condensation onto the bar in the wrapping room although the use of milder cooling temperature decreases the need for a rewarm zone. The rewarm zone is preferably employed immediately after the rapid cooling zone.

According to the invention, the rewarm period is optimally for about 1 minute (although it can be a longer or shorter period of time) at a temperature of about 10° C. using a rewarm H value of about 75 $W/m^2°C$.

Preferably, the rewarm zone has a temperature between about 7 and 18° C., advantageously between about 10 and 15° C.

If the dew point of the wrapping room or environment the set chocolate is subjected to is appropriately controlled to be lower than the surface temperature of the product exiting the rapid cooling tunnel, then a rewarm zone is not necessary.

The rewarm zone does not need to use high convective heat transfer coefficients to provide an acceptable product. However, using high convective heat transfer coefficients appears to provide a product that has further improved properties such as enhanced bloom resistance, improved gloss, etc. This is believed to result from the better retention of the fine crystal morphology provided by the rapid cooling. Preferably, the H value is greater than about 25 $W/m^2°C$., advantageously greater than about 40 $W/m^2°C$., even better greater than about 50 $W/m^2°C$. and most preferred better than about 75 $W/m^2°C$. Even more preferred greater than 90 $W/m^2°C$.

Preferably, the time in the rewarm zone is between about 5 sec. and 3 min., advantageously between 10 sec. and 2 min., even better between 15 seconds and 1½ min. and most preferred between 20 and 60 seconds.

Another aspect of the invention relates to the ability to form thermally robust products having acceptable gloss by the introduction of a controlled amount of a sugar solubilizing agent, such as moisture, in the rewarm zone. It has been discovered that, contrary to conventional knowledge, it is advantageous to introduce controlled moisture in the rewarm zone. Surprisingly, if a set chocolate product is passed through a rewarm zone with controlled moisture, the bar displays enhanced surface robustness by not melting readily in hand.

It is known that adding minute quantities of water to chocolate during processing can enhance heat stability and robustness. The resulting chocolate bar products will resist deformation at elevated temperatures. It is believed the water crystallizes the amorphous sugar throughout the chocolate forming a network structure that enhances heat stability. However, adding water during processing greatly increases the viscosity of the chocolate making it more difficult to work with.

It is also known that with chocolate bars having high moisture centers, the high moisture in center migrates out to surface after several weeks. The moisture crystallizes the sugar throughout the chocolate matrix forming a "sugar matrix". The result is a chocolate bar that does not readily melt in hand. However, such bars require a period of time to result in the heat resistant product. Moreover, not all bars (i.e., solid chocolate bars) have high moisture centers.

Surprisingly, it has been discovered that exposing the chocolate to moisture or any other suitable sugar solubilizing agent in the rewarm zone forms an outer "shell" that enhances the robustness of the chocolate. Moreover, the advantages of using controlled condensation is not limited to rapid cooled chocolate. These advantages are also obtained using controlled moisture rewarm zones after conventional passive cooling tunnels.

Therefore, yet another aspect of the invention relates to the use of controlled moisture condensation in the rewarm zone. As set forth above, the rewarm zone follows the cooling tunnel and warms the set chocolate to a temperature above the dew point to reduce condensation on the bar prior to wrapping. It has been discovered that passing a rapidly cooled bar (or conventionally cooled bar) through a rewarm zone with controlled condensation or exposure to a sugar solubilizing agent results in a bar that does not melt as readily in hand. About 24 hours later, the robust bar can be picked up with reduced and/or delayed melting in the hand.

As stated above, it is believed the chocolate product formed using the controlled moisture rewarm zone results in a thin layer of crystalline sugar formed at the surface of chocolate. The layer, "sugar shell", is formed only at the outer surface portion of the chocolate and results in a chocolate having an outer sugar shell zone that has increased resistance to heat and an unchanged or unmodified inner portion. Preferably, the thickness of the sugar shell is less than 25 microns.

Since only the exposed surfaces of the chocolate product is exposed to the moisture when transported on a conventional belt, the top and side portions of a bar, for example, may have a different sugar shell formation compared to the bottom surface, which may have none at all. It is also believed to work only with amorphous lactose or amorphous sugar present in chocolate.

Accordingly, one preferred embodiment of the invention relates to a method of processing chocolate comprising setting chocolate by cooling a chocolate composition containing a liquid fat phase so that at least a portion of the fat solidifies and then rewarming the cooled chocolate in an atmosphere containing a controlled amount of moisture.

Preferably, the controlled solubilizing rewarm zone has a temperature greater than 10° C.

The exposure to the solubilizing rewarm zone is for a time period ranging from 5 seconds to 2 minutes.

A still further aspect of the invention relates to the discovery that if the cold set bars are warmed very slowly to room temperature (i.e., from rewarm zone to room temperature) the result is an even finer fat grain structure and even greater bloom resistance. This can be achieved, for example, by placing the bars in a insulated cooler with ice packs and warming to room temperature over a period of about a week.

Accordingly, another preferred embodiment relates to slow rewarming of chilled set chocolate to room temperature and products produced by such methods. Preferably, after cooling the chilled set chocolate is warmed to ambient temperature at an average rate of less than 2° C. per hour, advantageously less than 0.2° C. per hour, even better less than 0.1° C. per hour.

According to another embodiment, the period of time to warm the chocolate to room temperature is greater than 2 hours, advantageously greater than 12, even better greater than 48 hours, and most preferred greater than 96 hours.

Alternatively, an acceptable product can be made wherein the bulk temperature of the chocolate is raised at an average rate of 2° C./minute to ambient temperature.

A still further aspect of the invention relates to the discovery that rapidly cooled chocolate may be used without the use of any tempering or the use of seeding agents, but may be produced by simply shearing the chocolate. For example, untempered chocolate at about 33° C. may be sheared on the top surface with a blade and passed through the rapid cooling tunnel. The resultant product has resistance to bloom on the top surface, however, the unsheared side portions bloom easily. It is believed the shearing initiates the formation of stable crystals at a significant enough level to be viable for use with rapid cooling conditions. This does not appear to work with non-rapid cooled chocolate.

Accordingly, another aspect of the invention relates to a method of setting chocolate comprising the steps of shearing the chocolate while liquid or semi-solid (tempered or no-temper) and subsequently setting the chocolate by rapid cooling. The melted chocolate is subjected to shear immediately prior to the rapid cooling to initiate the formation of a sufficient amount of temper crystals.

A still further aspect of the invention relates to a method of rapidly setting the bottom or base portion of an enrobed chocolate product ("bottom freezing") using low temperatures to rapidly set the chocolate bottom.

The bottom freezing according to the invention may be carried out, for example, by conveying the enrobed product on a conductive belt material over chilled platens which are in good thermal contact with the belt. Another example would be a steel belt cooled by a fluid coolant spray such as glycol, cryogenic gases, or other high convective underside cooling. Bottom freezing according to the invention differs from conventional bottom setting in much the same way conventional cooling differs from the presently disclosed rapid cooling methods in that, surprisingly low temperatures enable the setting of the chocolate bottoms far more rapidly than is possible using conventional methods.

Conventional bottom setting, like conventional cooling, uses gentle, passive conditions. The temperatures used in conventional methods are typically around 10° C. or higher. As a result, the setting of the bottom of a well tempered chocolate takes more than 2.5 minutes. Since the bottom must be set before the enrobed product can be transferred to the next conveying belt, the length of the first belt must be long enough or slow enough to allow the bottom to set. As a result the first leg of any conventional cooling apparatus is fairly long typically ranging from 10 to 30 meters. Moreover, since most conveying belts are unable to turn corners without causing the bottom to deform, the resulting belt has to be long and straight. This, in turn, requires a large space for containing the apparatus.

The bottom freezing of the invention uses operating temperatures of the order of those used in rapid cooling.

The bottom freezing is preferably achieved using a temperature below about −5° C., advantageously less than about −10° C., even better less than about −15° C. and most preferred less than about −20° C. Even lower temperatures such as below about −25° C., below about −30° C. and even below about −35° C. to set the bottoms even more rapidly.

One advantage of the rapid bottom setting of the invention is the ability to set the bottoms in a short period of time. This, in turn, allows the enrobed product to be transferred to a second belt or onto a mesh-like belt or around corners within a short period of time. The use of mesh belts is advantageous since it may assist the achievement of higher convection H-values due to better air or gas circulation through the meshed belt. The ability to turn corners advantageously compacts the chocolate processing line. This even further increases the efficiencies of the methods according to the invention.

The bottom freezing or bottom setting is preferably achieved with in time period less than about 2 minutes, advantageously less than about 1.5 minutes, even better less than about 1 minutes and most preferred less than about 45 seconds. Even shorter times such as less than 30 second are possible if the lowest stated temperatures are employed.

The bottom freezing methods of setting bottoms employ similar belts and platens to those that are used with conventional methods. However, since much colder temperatures are employed with bottom freezing, the materials used for the belt and platens should be capable of functioning in these environments. The belt material, for example, should be selected and designed to maintain its flexibility at temperatures as low as −30° C. and lower. Suitable belt materials would include Burell Polycool.

A still further aspect of the invention relates to the use of a cooling step involving high heat transfer rates in combination with the passive conventional type of cooling to provide a cooling method having advantageous characteristics such as increased efficiencies. The rapid cooling step can be combined at any stage of the conventional cooling process. Similar to the rapid cooling methods described above, the rapid cooling of this aspect of the invention can be employed using low temperatures and/or high convective H-values provided by chilled gaseous or fluid medium, i.e., air, liquid nitrogen, etc.

One embodiment relates to a method involving the partial setting of a chocolate using a short burst of highly effective cooling to provide a glossy skin on the surface of the chocolate while the inner portions of the confection remain unsolidified. This is achieved by employing low temperatures and/or high convective heat transfer coefficients (using the parameters outlined above with respect to full rapid cooling) followed by conditioning to promote further crystallization at conditions favoring polymorphic transformations and stable crystal growth. This allows the chocolate to have a glossy surface without having to rapidly cool the entire mass. Such methods result in increased efficiencies since instead of solidifying the entire mass through use of low temperatures and/or high H-values, the mass is solidified quickly by merely maintaining the unsolidified mass at the temperature for optimal crystal growth. Accordingly, the energy intensive rapid cooling is employed to set the outer skin of the confection or solidify a significant portion of the outer surface, i.e., the surface may not be completely set as long as viscosity of the surface is high enough that gloss is retained, while the favorable crystallization kinetics at the optimal crystal growth temperature is employed to solidify the remaining chocolate mass. This provides a more energy efficient method of forming a glossy product without a molding step and without a significant increase in setting times.

Another embodiment relates to methods involving the use of a second stage rapid cooling step after a critical amount of solidification has occurred through stable crystal growth as per conventional cooling. The rapid cooling step is employed after the initial passive cooling to solidify the remaining portions of the fat phase quickly.

Figure 11:
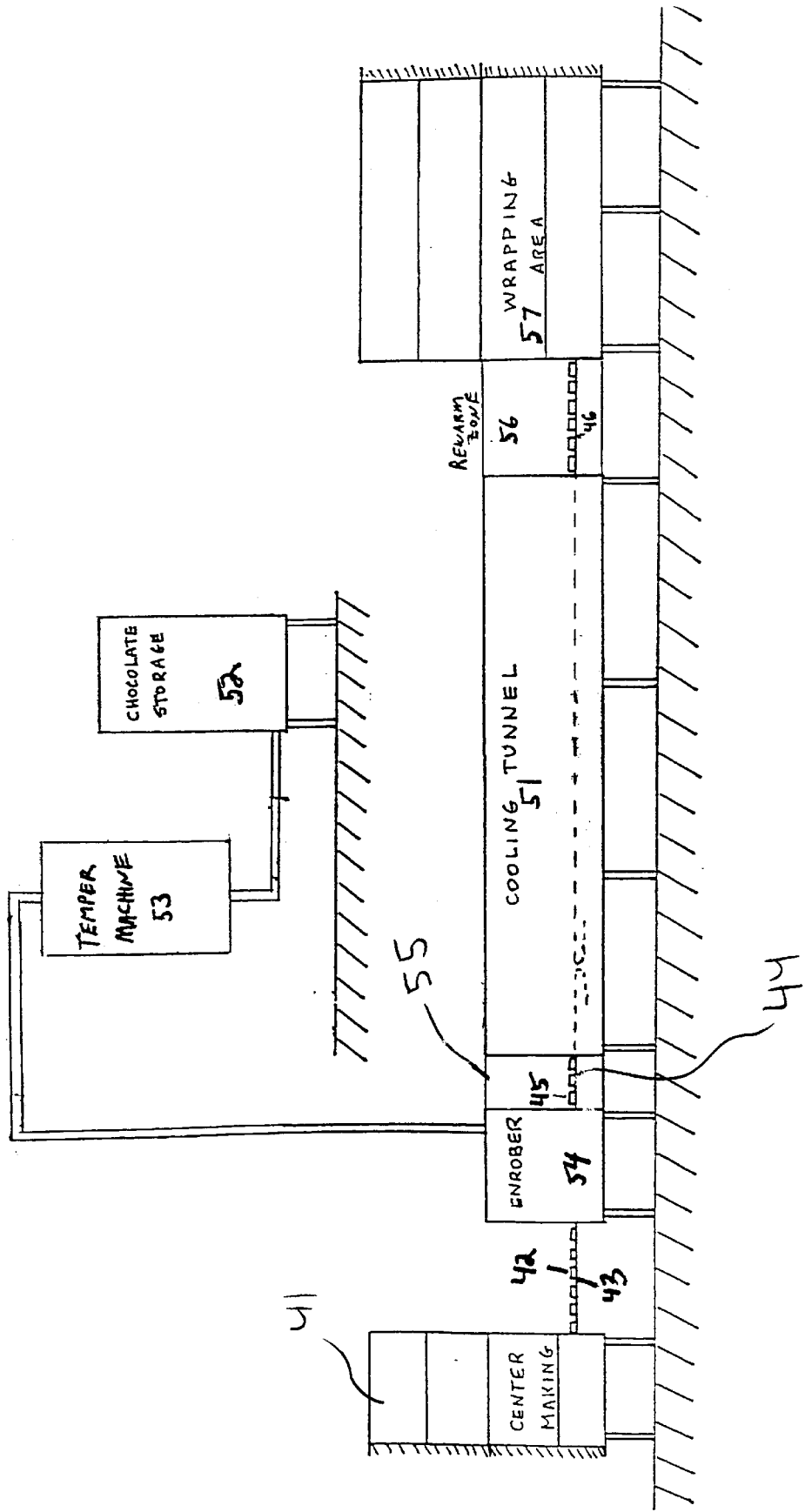
FIG. 11 illustrates a side view of an enrobing process according to one embodiment of the present invention for producing an improved chocolate confection.

A still further aspect of the invention relates to systems for performing the methods according to the invention. FIG. 11 illustrates a schematical view of one preferred embodiment of an enrobing line in accordance with the teachings of the present invention. As illustrated in FIG. 11, center making operation 41 produces centers 42 formed of an edible substance. The formed centers 42 are then transported on a conveyor 43 to the enrober 54 where chocolate is coated upon the centers. This chocolate is stored in a chocolate storage tank 52 at a temperature typically about 45° C. The chocolate is then pumped through a tempering machine 53 to create tempered chocolate (the development of seed crystals). The tempered chocolate is pumped to the enrober 54 where it is coated upon the center 42. The coated centers 45 are transferred to a belt conveyor 44 which transports the coated centers through a transition zone 55 into a cooling tunnel 51 which hardens the chocolate and thereby sets the chocolate coated centers for wrapping. The cooling system of the invention should be designed to deliver consistent, continuous performance at a specific set of operating conditions. Inside the tunnel the centers transfer to another belt 46 which conveys the centers through a rewarm zone 56 and into the wrapping area 57.

If the system is in an environment that does not have humidity control, the cooling tunnel 51 should include an outer insulating structure having an insulating value such that condensation formation on the outer surface of the cooling zone is prevented.

According to an alternative embodiment, the temper machine 53 can be replaced with the use of seeding agents, preferably by the methods set forth in corresponding U.S. application Ser. No. 08/782,903 entitled "Methods of processing chocolates at low viscosities and/or at Elevated Temperatures Using Seeding Agents and Products Produced By Same" by Neil A. Willcocks, Thomas M. Collins, Frank W. Earis, Ralph D. Lee, Arun V. Shastry, Kevin L. Rabinovitch and William Harding, filed concurrently and herein incorporated by reference. These seeding agents in effect temper the chocolate before being coated on the center 42.

According to yet another embodiment, the center making operation 41 can be replaced with a device for depositing the chocolate confection and/or the enrober 54 can be replaced with a forming device such as a unit which contacts a mass of confection deposited onto the conveyor and suitably forms the confectionery mass into the desired confectionery product before being cooled, preferably such as the forming devices described in corresponding U.S. application Ser. No. 08/782,901 entitled "Methods of Shaping or Embossing Chocolates with a Chilled Forming Device and Products Produced by Same" by Neil A. Willcocks, William Harding, Ralph D. Lee, Thomas M. Collins, Frank W. Earis and Steven D. Stephens, filed concurrently, and herein incorporated by reference. Alternatively, a forming device can be included within the enrober, the transition zone or the front section of the cooling tunnel.

The cooling system preferably includes a transition zone 55 before the cooling chamber 51. The transition zone is a controlled, non-cooling environment between the enrober (or any other pre-setting processing apparatus such a molding device) and the cooling tunnel to ensure the satisfactory operation of both processes. The transition section can include a cooling belt which extends out of the cooling chamber through the transition zone to the enrober or other related apparatus.

The transition zone should be enclosed and be maintained at non-cooling temperatures and at low dew points. This will ensure that (a) the product does not cool uncontrollably, (b) cool air from the cooling tunnel does not spill into the enrober, (c) moisture ingress into the cooling tunnel is minimized, and (d) moisture does not condense on the cooling belt.

The transition zone should be as short as possible so as to increase efficiency of the process by not unnecessarily lengthening the production line. Preferably, the transition zone should be less than one meter. The environment of the transition zone should include an air temperature of about 31° C.+/−1° C. with an air dew point of about −20° C. Air exchange between the cooling zone and the enrober should be minimized. If cooled air is exchanged into the enrober unit, the temperature of the enrobing chocolate will decrease dramatically resulting in numerous problems. The prevention of such an exchange can be achieved using positive pressure differentials between the transition zone and both the enrober and the cooling zone. Accordingly, one particularly preferred system includes a transition zone before and proximate to the product inlet of the cooling zone. In this preferred embodiment, the transition zone is formed of a controlled, non-cooling environment and is attached to the cooling zone to reduce the flow of chilled air from the cooling zone and to reduce the flow of moisture into the cooling zone. The transition zone is preferably capable of providing an operating temperature from about 25 to 35° C.

Figure 12:
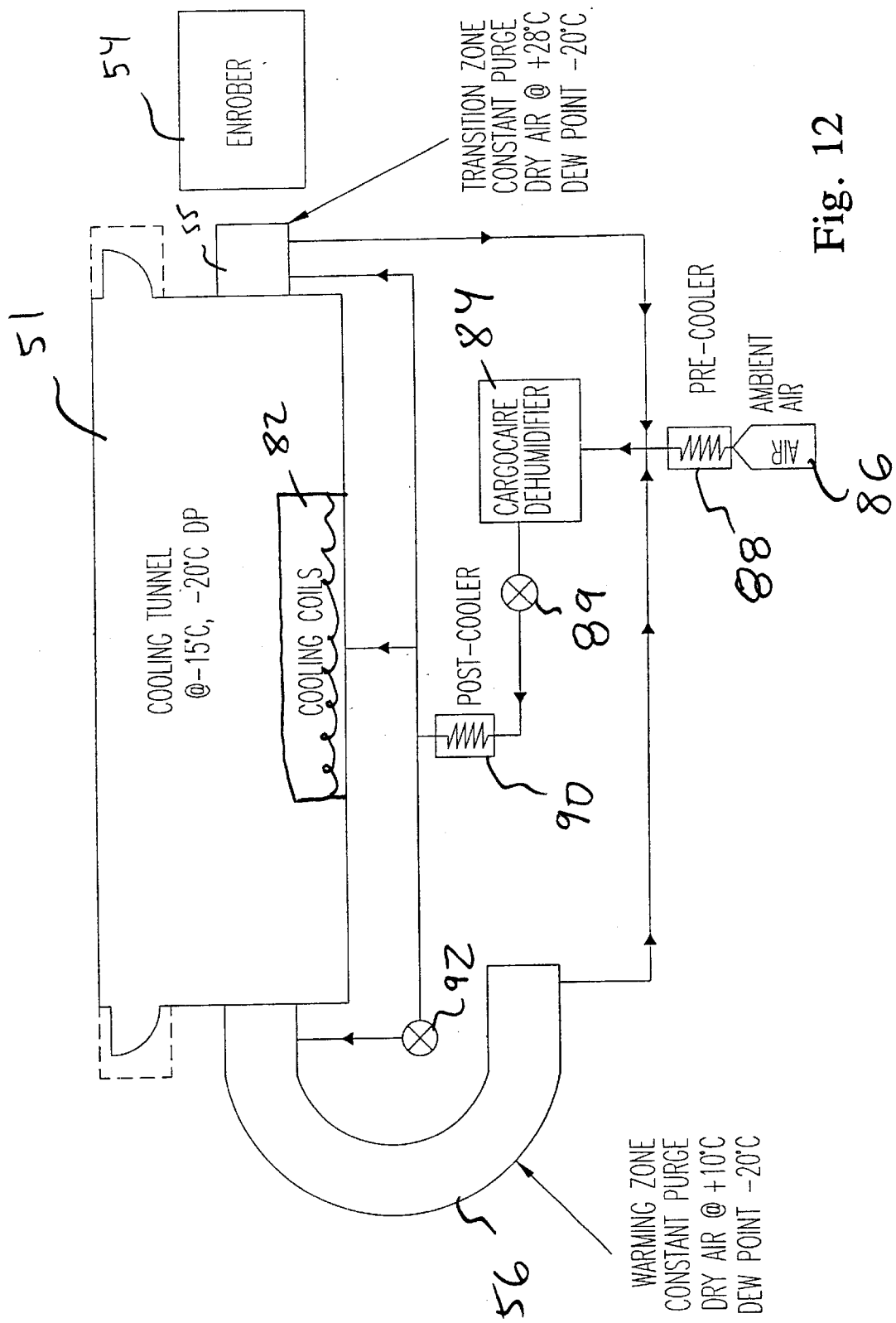
FIG. 12 is a top schematical view of an enrobing system according to one embodiment of the invention.

A schematic representation of an enrobing line for performing the method shown in FIG. 11 is shown in FIGS. 12 and which illustrate two preferred embodiments of an enrobing process in accordance with the teachings of the present invention. The enrobing line shown in FIG. 12 comprises a cooling system having a cooling tunnel that includes an internal cooling unit, i.e., a cooling fan and coils with internally circulating refrigerated fluid to chill and circulate the gaseous environment within the cooling chamber.

More specifically, as shown in FIG. 12, after the centers have been coated with chocolate in the enrober 54, the coated centers are conveyed to the transition zone 55. The transition zone 55 is constantly purged at a dry air temperature of about +28° C. with an air dew point of about −20° C. The coated centers are then transferred to the cooling tunnel 51. The cooling tunnel 51 is maintained at an air temperature of about −15° C. with an air dew point of about −20° C. The cooling tunnel 51 of FIG. 12 includes an internal cooling unit 82. Although not shown in FIG. 12, this internal cooling unit includes a cooling fan and coils with internally circulating refrigerated fluid to chill and circulate the gaseous environment within the cooling chamber. The cooled coated centers then enter the rewarm zone which is maintained at a dry air temperature of about +10° C. and an air dew point of −20° C.

Gaseous air which has been purged from both the transition zone and the rewarming zone is returned to a dehumidifier 84. Before entering the dehumidifier 84, the purged air is optionally mixed with ambient air 86 which has been pre-cooled in pre-cooler 88. The dehumidified air is then conveyed through a fan 89 into post cooler 90. This cooler air is then resupplied directly into the transition zone (where it may be warmed) and the cooling tunnel and is blown into the rewarm zone by means of fan 92.

Figure 13:
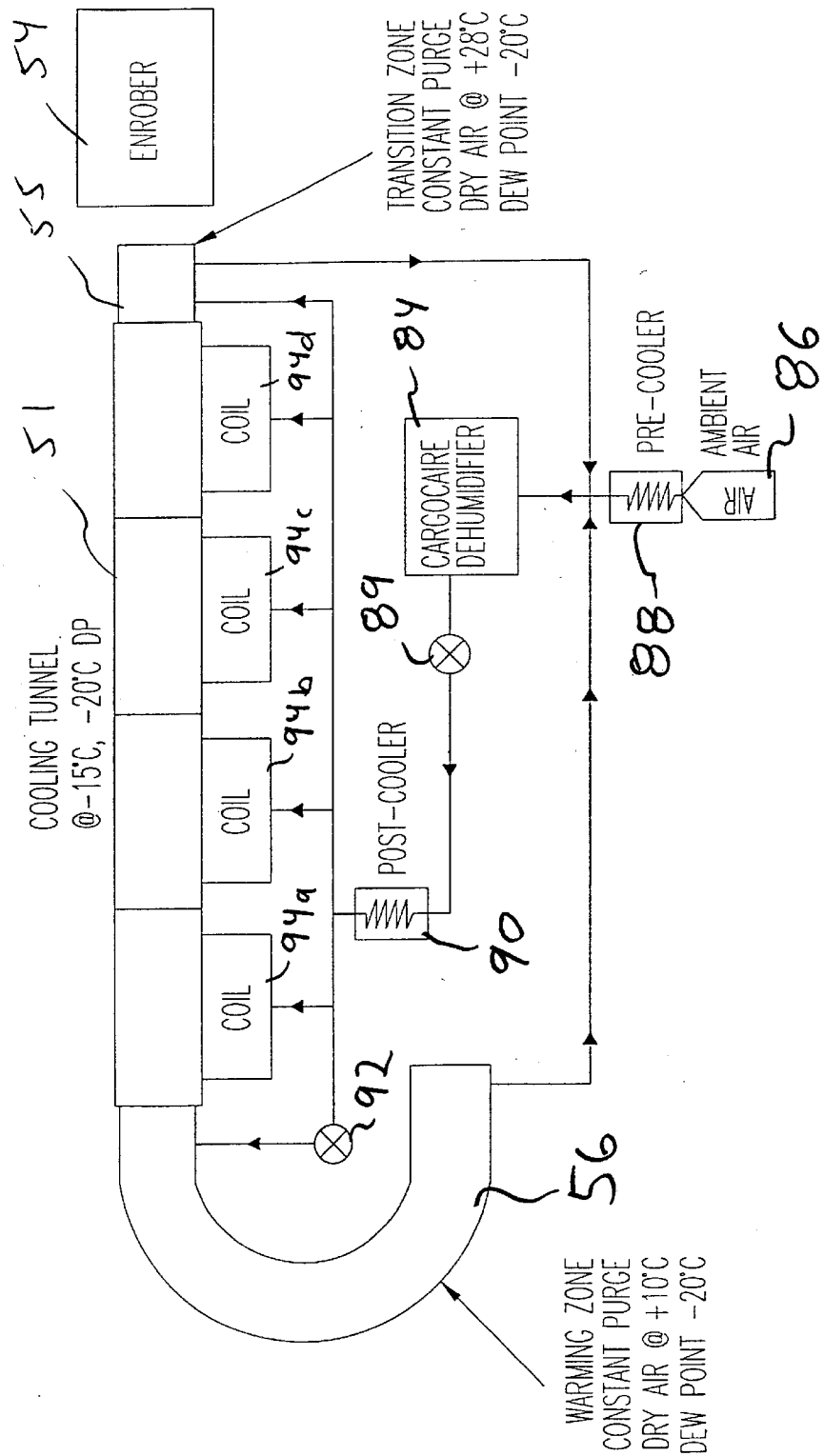
FIG. 13 is a top schematical view of an enrobing system according to another embodiment of the invention.

FIG. 13 illustrates a cooling apparatus similar to that illustrated in FIG. 12 except that cooling coils, such as 94a, b, c and d, are provided external to the cooling chamber.

Figure 14:
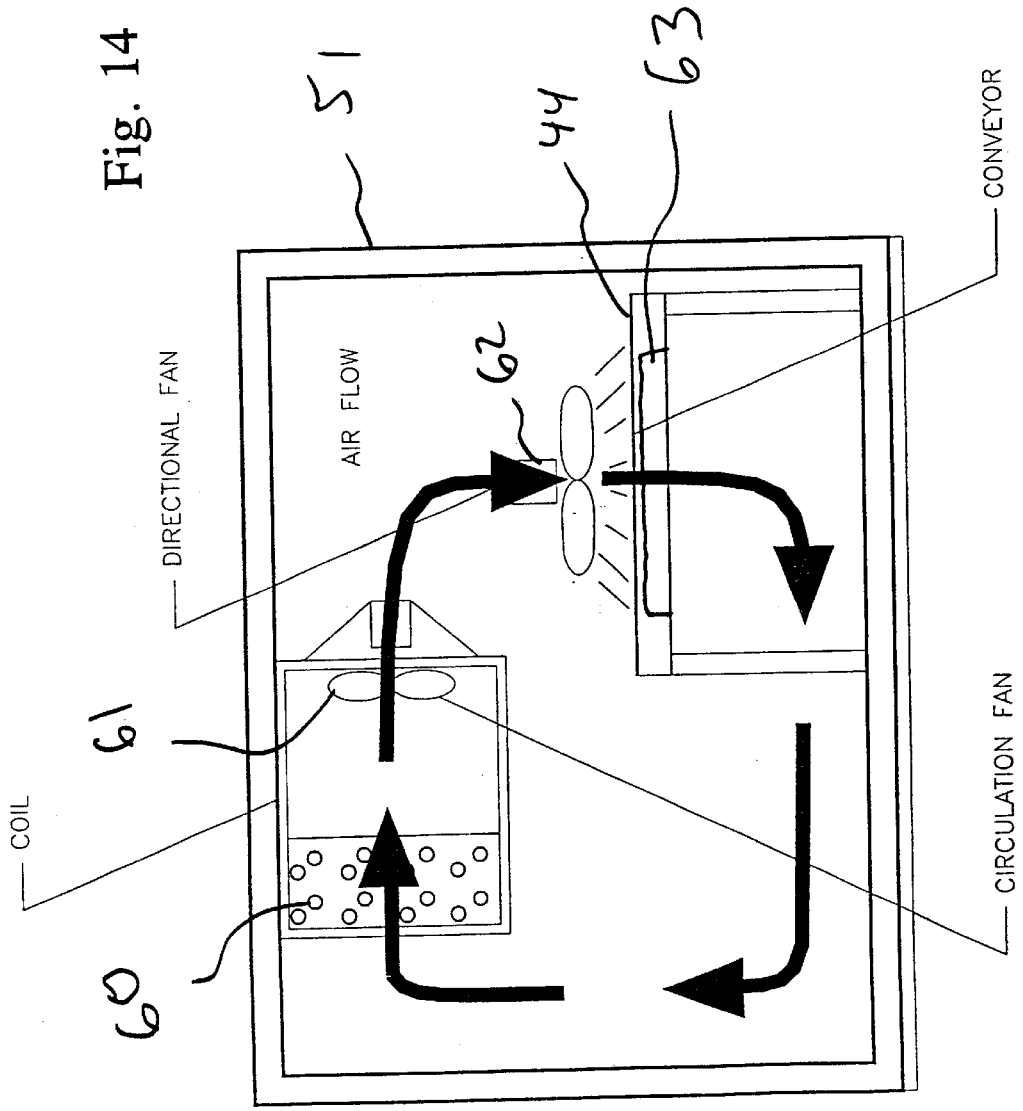
FIG. 14 is a front perspective cross-sectional view of a chocolate confection cooling apparatus according to one embodiment of the invention.

The internal details of a cooling tunnel suitable for use in an enrobing line (or other confectionery line) as shown in FIG. 11 is illustrated in FIG. 14. The centers are carried on belt conveyor 44 into the cooling tunnel 51 over a cooling platen 63 in adequate contact with the underside of the belt. The air in the tunnel is cooled by a coil 60 through which refrigerated fluid is flowing to cool the air. The air is drawn over the coil by fan 61 to provide a continuous circulation of air over the coil. In an alternative embodiment, the fan and coil are mounted external to the cooling tunnel enclosure 51. The air velocity in the tunnel can be further accelerated by a directional fan 62 which accelerates the velocity of the air in the tunnel in an impinging manner to provide the required convective heat transfer coefficient.

Figure 15:
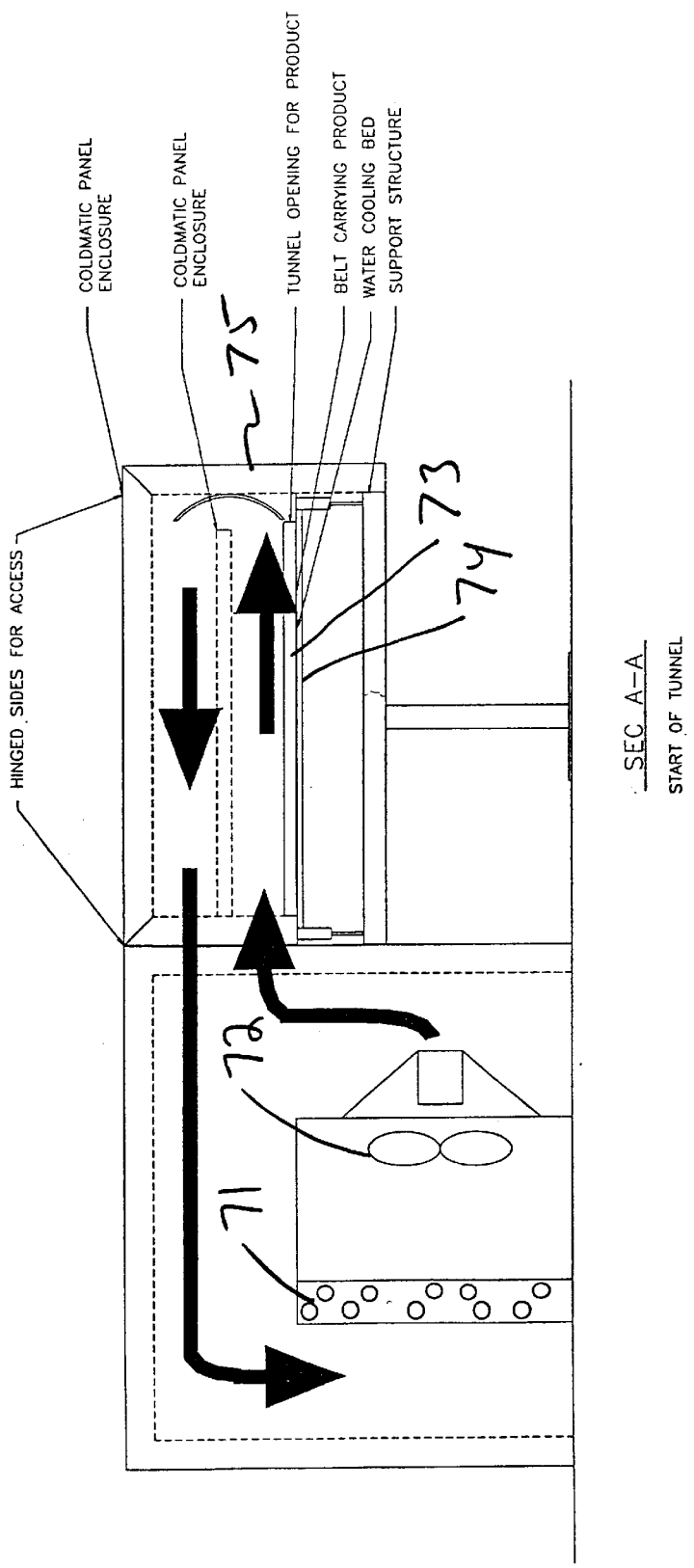
FIG. 15 is a side schematical view of a chocolate confection cooling system according to another embodiment of the invention.

An alternative embodiment of a cooling system in according with the enrobing process of the present invention is shown in FIG. 15. The centers are conveyed into enclosure 75 on belt 73 this belt being the same as belt 44 in the previous embodiment. The belt is in sufficient contact with cooling bed 74. The air in the tunnel is cooled by coil 71 which is itself cooled by refrigerated fluid. The air is drawn over the coil by fan 72 which also accelerates the air to increase the heat transfer coefficient. The air can be directed as it enters the enclosure such that the air travels across, against or with the direction of product flow or any combination of direction as needed.

Accordingly, a still further embodiment of the invention relates to cooling systems or apparatuses for rapidly cooling chocolate confections. Unlike conventional chocolate confection cooling systems, the cooling systems of the present invention provide very high heat transfer rates using a combination of low operating temperatures and/or the ability to provide very high convective heat transfer coefficients.

One important difference between a conventional commercial chocolate confection cooling tunnel and a rapid cooling tunnel is typically the length of the tunnel. Since rapid cooling allows for the setting of the chocolate in significantly less time, the rapid cooling zone can be significantly shorter for any given line speed. Moreover, the temperatures used in conventional cooling systems are typically around 10° C. or higher, compared with the rapid cooling tunnels which provide operating temperatures below 0° C. A typical conventional cooling tunnel would have a length of from 60 to 300 feet depending on speed. Conversely, the rapid cooling tunnels can be as short as 10 to 100 feet for the same line speed. This aspect of the rapid cooling systems has obvious advantages.

According to the invention, the rapid cooling of an enrobed product may be achieved, for example, by conveying the enrobed product through an aggressive cooling zone on a thermally conductive belt material over chilled platens which are in sufficient thermal contact with the belt. Another example of a conveyor would be a steel belt cooled by a fluid coolant spray such as glycol, cryogenic gases, or other high convective underside cooling.

The system preferably comprises a cooling tunnel having a single cooling chamber to set the chocolate, followed by a rewarm zone to appropriately warm the surface of the confection prior to its delivery into the wrapping room. The wrapping room preferably has a dew point maintained at, or below 10° C. throughout the year. Dew point variations to temperatures above 10° C. may result in condensation and/or dulling of the confection and will require modifications to the rewarm zone. The wrapping room air temperature is also appropriately controlled, ideally at about 15° C., or at least below 20° C. throughout the year. Air temperature variations to temperatures above 25° C. may result in significant softening of the chocolate. As a result, the chocolate may build up on the contact surface of the wrapping apparatus.

The aggressive cooling system of the invention includes (1) a refrigeration unit or is connected to a refrigeration unit to provide the low temperatures, (2) a device for increasing the convective heat transfer coefficient within the cooling chamber or is connected to such a device, i.e., an external cooling fan and (3) a unit for dehumidifying the cooling environment to prevent the formation of ice within the cooling chamber.

The cooling systems of the invention may employ similar belts and platens to those that are used with conventional methods. However, since much colder temperatures are employed with bottom freezing, the materials used for the belt and platens should be capable of functioning in these environments. The belt material, for example, should be selected and designed to maintain its flexibility at temperatures as low as −30° C. and lower. Suitable belt materials would include Burell Polycool.

Accordingly, one embodiment of the invention relates to a chocolate confection cooling system for rapidly cooling tempered chocolate having a temperable fat phase to form a chocolate confection comprising:

(a) a cooling zone having a product inlet and a product outlet;

(b) a means to enhance convective forces by increasing flow of cooling gaseous medium within the cooling zone;

(c) a means for conveying chocolate compositions through the cooling zone; and (d) a cooling means for cooling the undersurface of the means for conveying chocolate compositions;

wherein the chocolate confection cooling system is capable of providing operating temperatures within the cooling zone less than −5° C. and convective heat transfer coefficients greater than 75 W/m$^2$.°C.

Another embodiment of the invention relates to a chocolate confection cooling apparatus for rapidly cooling tempered chocolate having a temperable fat phase to form a chocolate confection comprising:

(a) a cooling zone having a product inlet and a product outlet;

(b) a means to enhance convective forces by increasing flow of cooling gaseous medium within the cooling zone; and (c) a means for conveying chocolate compositions through the cooling zone comprising a conveyor belt, wherein the chocolate confection cooling apparatus is capable of operating at temperatures less than −5° C. and capable of providing convective heat transfer coefficients greater than 75 W/m².°C.

The rapid cooling system preferably further includes a transition zone before and proximate to the product inlet of the cooling zone, wherein the transition zone defines a controlled, non-cooling environment and is attached to the cooling zone to reduce the flow of cool air from the cooling zone and to reduce the flow of moisture into the cooling zone. The transition zone is capable of providing an operating temperature from about 25 to 35° C.

The system or apparatus further includes a unit for dehumidifying the cooling zone and the transition zone.

The assembly preferably includes fans to increase the flow of cooling gaseous medium and enhance the convective forces. Furthermore, the cooling assembly for the undersurface preferably includes cooling platens.

EXAMPLES

The following examples are illustrative of some of the products and methods of making the same falling within the scope of the present invention. They are, of course, not to be considered in any way limitative of the invention. Numerous changes and modification can be made with respect to the invention.

Example 1

A milk chocolate composition is prepared using the formulation in Table 1-A below:

TABLE 1-A

| Milk Chocolate Formulation | |
| --- | --- |
| Sucrose | 50.00% |
| Cocoa Butter | 20.49% |
| Whole Milk Powder | 18.00% |
| Chocolate Liquor | 11.00% |
| Lecithin | 0.50% |
| Vanillin | 0.01% |

The chocolate mixture is refined to reduce the solid particle sizes to 25 microns (by micrometer) and then loaded into a Petzholdt Conge. The chocolate is dry conged for 6 hours after which lecithin is added. The chocolate is then spun in the conge for 30 minutes. The conged chocolate is transferred into a tank where additional lecithin and cocoa butter are added. (standardization) to achieve an apparent viscosity of 20,000 cps at 45° C. The standardized chocolate is then tempered in a continuous Sollich Solltemper-Turbo Model MSV3000 where the chocolate is cooled from 45° C. to 28° C. with aggressive shear to produce cocoa butter crystals of stable and unstable polymorphs. The tempered chocolate is warmed slightly in the last section of the Solltemper to 31° C. to melt out unstable crystals. The tempered chocolate is at 31° C. and has a temper level of 6 CTU (°F.) and −0.5 slope as determined by Tricor Tempermeter Model 501. The chocolate is then pumped to the enrober.

The centers to be coated with chocolate are cut hard, chewy nougat centers 20 mm square by 14 mm tall and are comprised of the composition set forth in Table 1-B (below) and prepared by the method described in *Chocolate, Cocoa and Confectionery:*

Science and Technology, by Minifie, 3rd Edition, pg. 578–580.

TABLE 1-B

| Hard Chewy Nougat Formulation | |
| --- | --- |
| Egg Albumen | 0.37% |
| Sucrose | 43.22% |
| Glucose Syrup | 36.63% |
| Water | 19.78% |

The centers have an average temperature of 24° C. at time of enrobing. The centers are carried into the enrober, a Sollich Enromat, on a wire mesh belt where the liquid tempered chocolate is cascaded from a curtain forming trough to completely coat the centers. Excess chocolate is removed by blowers impinging onto the top surface of the chocolate and by aggressive shaking. The excess chocolate passes through the wire belt into the sump of the enrober where it is recirculated back to the curtain trough. The bottoms of the centers are coated by passing through a wave of tempered chocolate created by a roller under the wire mesh belt. (Alternatively, the centers may be coated in a continuous enrober as described in Minifie, 3rd Ed., pages 216–218). The amount of chocolate enrobed onto the nougat is 35% by weight of the total finished chocolate confection with an average thickness of about 2 mm. The enrobed nougat centers coated with liquid tempered chocolate are transferred from the wire belt to the cooling tunnel by a solid conveyor plastic coated belt (Burrell Polycool PC4, thermal conductivity of (0.004 cal/cm²/° C.). There is a 10 second time period from the time the coated centers exit the enrober to the time they enter the cooling tunnel.

The cooling tunnel is comprised of three sections. The first section comprises an environment with an air temperature of 17° C. with an average H-value of 35 W/m²°C. The coated centers are carried by the conveyor belt over platens situated under the conveyor belt in the first section of the tunnel. These platens are cooled to 15° C. by recirculating cooling media and set the chocolate on the bottoms of the coated centers so that the pieces release from the conveyor belt in 3 minutes to transfer the coated centers to the second cooling tunnel section belt. The second section of the tunnel has an operating temperature of 12° C. and an H-value of 35 W/m²°C. to allow somewhat faster cooling than the first section while not subjecting the chocolate to undue "thermal shock". The coated centers are in the second section of the tunnel for 5 minutes. The last section of the tunnel is 2 minutes long and has an operating temperature of 18° C. and an H-value of 35 W/m²°C. to warm the surface of the set chocolate so that the surface is above the dewpoint of the environment upon exiting the tunnel. The total time in all three sections of the cooling tunnel is 10 minutes. The resultant finished chocolate confection exiting the tunnel has a glossy surface and is sufficiently firm to be wrapped/packaged without significant deformation or abrasion. The finished pieces are then wrapped or packaged in an environment with a temperature of 20° C. with a dewpoint of 15° C. The finished chocolate confection is also bloom stable.

Example 2

A milk chocolate having a formulation similar to that used in Example 1 was prepared in the manner described in Example 1. The chocolate was tempered in a Sollich Solltemper-Turbo MSV3000 to a temper level of 7 CTU (°F.) and a slope of −1.0 measured on a Tricor Tempermeter. The centers were formed as in Example 1, except with two layers. The bottom layer of nougat was 10 mm thick overlaid with a 4 mm thick layer of caramel (creating a 14 mm thick center) comprised of the formula in Table 3-A prepared in the manner similar to that described in Minifie, 3rd Ed., pp 533–537.

TABLE 2-A

Soft Caramel Formulation

| Corn Syrup | 40.00% |
|---|---|
| Sweetened Cond. Whole Milk | 37.40% |
| Sucrose | 13.50% |
| Milk Butter | 5.19% |
| Water | 3.40% |
| Salt | 0.50% |
| Flavorings | 0.01% |

The dimensions of the centers were 20 mm square and 14 mm high. The centers had an average temperature of 22° C. at time of enrobing. The centers were enrobed with tempered chocolate in a Sollich Enromat Type EMN 1050 in the manner as described in Example 1. The coated centers were then cooled in a Sollich chocolate cooling tunnel Type KK. The cooling tunnel consisted of three sections: the first section had a thin belt (Burrell PC4) sliding over the top of cooling platens cooled to a temperature of 13° C. The air in the first tunnel had an average temperature of 12° C. and an average H-value of 20 W/m$^2$°C. The residence time in this tunnel section was 3 minutes. The coated centers confections released from the first section belt and were transferred to a belt which traversed the final two sections of the tunnel. There was no cooling under the belt in the second and third sections. The second section had an operating temperature of 10 ° C. and an average H-value of 47 W/m$^2$°C. and third (final) section of the tunnel was 12° C. and had an average H-value of 42 W/m$^2$°C. The residence time in section 2 was 2 minutes, 30 seconds and 2 minutes, 30 seconds in section 3. The cooled chocolate confection exited the tunnel into an environment controlled to 15° C. ambient temperature with a 7° C. dewpoint. The finished chocolate confection had a gloss value of 190 (good to excellent subjectively) as measured by the Tricor Gloss Meter Model 801A and a hardness of 168 g as measured with a Voland-Stevens Model LFRA penetrometer equipped with a 15° cone, 1 mm penetration depth at 1 mm/sec penetration rate. This hardness was well above the minimum required for good wrapping/packaging. The finished chocolate confections were not tested for, but were considered to be bloom stable.

Example 3

The chocolate is prepared and tempered as described in Example 2. Caramel/nougat centers are prepared in the manner described in Example 2. The centers comprise a nougat layer 10 mm thick and a caramel layer 4 mm thick applied onto the top surface of the nougat. The overall size of the center is 14 mm high and 20 mm square. The centers are then enrobed to the level as described in Example 1. The coated centers pass through a transition zone where the conditions are 31° C. and –20° C. dewpoint. The air pressure in the transition zone is slightly higher than both the enrober and tunnel. This reduces the transfer of cool air from the tunnel to the enrober and the transfer of moist air from the enrober to the tunnel. The residence time in the transition zone is approximately 10 seconds. The coated centers then enter the cooling section of the tunnel. The environment in the tunnel is –15° C. with a dewpoint of –20° C. The average H-value above the belt in the tunnel is 125 W/m$^2$°C. The conveyor is a thin belt as described in Example 1 which rides on platens cooled by refrigerated liquid to a temperature of –15° C. The platens extend into the tunnel to the point where the coated centers and belt have been exposed to the cold platens for 1 minute. The remainder of the tunnel 1 minute 30 seconds is not equipped with cooling platens. The total time in the cooling section of the tunnel is 2 minutes 30 seconds. Upon exiting the cooling section, the cooled coated centers release from the belt, transfer to another conveyor and then enter the rewarm zone. The rewarm zone has a controlled atmosphere of 10° C., with a dewpoint of –20° C. and an average H-value of 75 W/m$^2$°C. The residence time in the rewarm zone is 40 seconds. The surface temperature of the finished chocolate confection is raised to 9° C., which is above the dewpoint of the environment at the exit of the rewarm zone. The resultant finished chocolate confection exiting the tunnel has a glossy surface and is sufficiently firm to be wrapped/packaged without significant deformation or abrasion. The finished chocolate confection is then wrapped or packaged in an environment with a temperature of 20° C. with a dewpoint of 7° C. The finished chocolate confection is also bloom stable.

Example 4

A dark chocolate composition is prepared using the formulation in Table 3 below:

TABLE 3

Dark Chocolate

| Sucrose | 50.00% |
|---|---|
| Chocolate Liquor | 36.30% |
| Cocoa Butter | 11.00% |
| Anhydrous Milkfat | 2.00% |
| Lecithin | 0.50% |
| Vanillin | 0.20% |

The chocolate is refined, conged and standardized as set forth in Example 1. The standardized chocolate is then tempered in a continuous Sollich Solltemper-Turbo Model MSV3000 where the chocolate is cooled from 45° C. to 29° C. with aggressive shear to produce cocoa butter crystals of stable and unstable polymorphs. The tempered chocolate is warmed slightly in the last section of the Solltemper to 32° C. to melt out unstable crystals. The tempered chocolate is at 32° C. and has a temper level of 4 CTU (°F.) and 0.0 slope as determined by Tricor Tempermeter. The chocolate is then pumped to the enrober.

Centers are prepared and enrobed as set forth in Example 3. The coated centers are then passed through the transition zone, cooled and rewarmed as set forth is Example 4. The finished chocolate confection is firm, glossy and bloom stable.

Example 5

Milk Chocolate having a formulation similar to that used in Example 1 was prepared as set forth in Example 1. The chocolate was tempered as set forth in Example 1 to an approximate temper level of 6 CTU and a slope of –0.5. Nougat centers were prepared as set forth in Example 1. The average center temperature was about 18° C. The centers were 120 mm long, 27.6 mm wide and 16 mm high. The centers were enrobed as outlined in Example 1. The final chocolate percentage was 40% by weight of the total confection. The average thickness of the chocolate coating was 2.5 mm.

The coated centers were then transferred to a belt (Burrell PC4 as in Example 1) which conveyed the product directly into the cooling tunnel. This belt extended from the enrober through the first 45 seconds of the time in the tunnel. The belt and product bottom was cooled by riding on a platen cooled by refrigerated liquid at −32° C. The product transferred to a second, wire mesh belt in the tunnel for the remaining time. The belt and product bottom was cooled by riding on a platen cooled by refrigerated liquid at −32° C. The cooling for the tunnel was provided by the direct injection of liquid carbon dioxide at 300 PSI which immediately sublimed to gas to provide the cooled environment. No solid carbon dioxide "snow" was visible in the tunnel.

A series of tests were performed as outlined in Table 5-A (below). The operating temperature, H-value and total time (including the initial 45 seconds in the tunnel) were varied and left to stabilize at the specific setpoints. The coated centers transferred to a second, wire mesh belt in the tunnel for the remaining time. Upon exiting the cooling zone, the cooled chocolate confections then transferred to a solid belt and passed through a rewarm zone with a range of temperatures of 10–12.5° C., average dewpoint of −16° C. and average H-value of approximately 66 W/m$^2$°C. The time in the rewarm zone was 20 seconds. The finished chocolate confections exited the rewarm zone into an environment controlled to 15° C. ambient temperature with a 7° C. dewpoint. The finished chocolate confections were subjectively judged immediately for their performance in terms of hardness and gloss. Gloss was measured again at 2 days and 38 weeks. The product was bloom stable.

that an increase in tunnel temperature can result in a less acceptable product. These results support the belief that the rapid cooling parameters can be individually adjusted to determine product performance. However, despite this flexibility, the incorrect selection of conditions could result in "intermediate zone" conditions being generated, which could result in product that is deficient in either hardness, gloss, bloom stability or combinations of all three. A certain cooling temperature, for example, may be too high to produce an acceptable product at certain H-values or cooling time, yet become acceptable if either the H-values and/or the cooling time is increased.

Example 6

Milk Chocolate and centers were prepared as set forth in Example 5. The chocolate was tempered to a temper level of between −3.6 and −4.0 CTU and +2.1 and 2.0 slope as measured by Tricor Tempermeter running with an extended sample analysis time of 9.5 minutes. The cooling tunnel was the same as set forth in Example 5 with conditions of −25° C. operating temperature, 3.5 minutes total cooling time and an H-value of 90 W/m$^2$°C. The cooled chocolate confection was rewarmed at +10° C., −14° C. dewpoint and an H-value of 90 W/m$^2$°C. for 20 seconds, after which the product was firm enough for wrapping. After wrapping, the product was held at 15° C. for seven days. Gloss after 8 days was 180 (subjectively good) as measured by Tricor Gloss Meter. After 38 weeks the product maintained a gloss level of 175 (subjectively good) and was free of fat bloom.

| SAMPLE # | TUNNEL TEMP. (° C.) | TEMPER | TUNNEL RESIDENCE TIMES (mins.) | Estimated H-value (W/m$^2$° C.) | IMMEDIATE EVALUATION OF PRODUCT | GLOSS 2 DAYS/38 WKS. | |
|---|---|---|---|---|---|---|---|
| A | −15 | 7.0 −0.5 | 3.5 | 75 | GOOD | — | — |
| B | −15 | — | 3.0 | 75 | GOOD | 199 | 210 |
| C | −15 | 6.1 −0.1 | 2.5 | 90 | GOOD | 194 | 199 |
| D | −15 | 7.0 −0.4 | 3.5 | 55 | GOOD | 191 | 198 |
| E | −15 | 5.3 +0.4 | 3.0 | 55 | GOOD | 186 | 188 |
| F | −5 | 8.8 +1.2 | 3.5 | 90 | GOOD | 168 | 176 |
| G | −5 | — | 3.5 | 75 | SOFT* | 164 | 172 |
| H | −5 | 4.3 +1.0 | 3.0 | 90 | VERY SOFT* | 175 | 182 |
| I | −5 | 3.9 +1.1 | 4.0 | 90 | GOOD | 186 | 178 |

*NOTE:
The products were evaluated for hardness and gloss. All GOOD products met or exceeded gloss and hardness in comparison to the standard products. SOFT products, and in particular VERY SOFT products, had good gloss; but the products were starting to get soft. Samples B and G were tempered, however, values were not taken. Sample A had acceptable gloss, however, it was not measured.

The results shown in Table 5-A confirm that many combinations of time, temperature and H-value may be used to produce good product. When operating near the edge of acceptable product performance, changes in only one variable can have significant negative or positive results. Comparison of samples H and I show that significant detrimental decrease in hardness was caused by changing the amount of time the sample was exposed to the cold temperatures. Sample H was cooled in the tunnel for only 3 minutes resulting in a very soft product, whereas Sample I was cooled for 4 minutes and had good hardness. Samples F and G show the effect of varying the H-value showing that a decrease in the H-value resulted in a less acceptable product. Samples A and G illustrate the effect of temperature showing Example 7

A finished chocolate confection was produced as set forth in Example 6 except with the use of an ultra-low temper level. The temper level was "no inflection" as measured by Tricor Tempermeter extended sample analysis time of 9.5 minutes. This condition is considered "no temper" by all conventional measures. The product was firm at wrapping and had a gloss level of 176 (subjectively good) after storage for 8 days as set forth in Example 6. The gloss level after 38 weeks was 165 (subjectively fair). All samples were free of visible fat bloom.

Example 8

Milk Chocolate was prepared similar to the method set forth in Example 1. The chocolate was tempered as set in Example 1 to levels as set forth in Table 8-A (below). In order to minimize the effect of center variation and to simplify the handling of potentially difficult samples, plastic (Ultra-High Molecular Weight Polyethylene) centers were used. The overall size of the center is 120.5 mm long by 28.0 mm wide by 16.4 mm high. The average center temperature was about 20° C. The centers were enrobed as outlined in Example 1. The final chocolate percentage was equivalent to 35% by weight of a standard nougat center confection. The average thickness of the chocolate was 2.0 mm.

The coated plastic centers were then transferred to a cooling chamber with controlled temperature and H-value. The products were placed into a cooling chamber comprising a controlled temperature atmosphere and variable speed fan to provide variable H-value. The chamber air temperature was controlled to setpoint by recirculating the air over refrigerated coils inside the chamber. A series of tests were conducted as outlined in Table 8-A (below). The temperature and H-values in the chamber were varied and left to stabilize at the specific setpoints. The cooled products were wrapped within the chamber, without rewarm, to minimize condensation on the product and stored at 15° C. Gloss, by Tricor Gloss Meter, and hardness, by Voland-Stevens Penetrometer, results at 4 days age are displayed in Table 8-A (below):

| TEST NO. | TIME Min | TEMP. °C | H. VALUE (W/m$^{2°C}$) | CTU | SLOPE | DECO-RATED GLOSS | HARD-NESS |
|---|---|---|---|---|---|---|---|
| A | 3 | 5 | 125 | 8.2 | −1.0 | 201 | 198 |
| B | 3 | 0 | 125 | 8.4 | −1.1 | 174 | 191 |
| C | 3 | −5 | 125 | 9.6 | −1.5 | 170 | 251 |
| D | 3 | −10 | 125 | 8.4 | −1.0 | 189 | 251 |
| E | 3 | −15 | 125 | 8.1 | −1.0 | 200 | 262 |
| F | 3 | −30 | 125 | 9.0 | −1.3 | 174 | 234 |
| G | 4 | 5 | 125 | 8.3 | −1.2 | 145 | 159 |
| H | 4 | 0 | 125 | 8.4 | −1.1 | 169 | 179 |
| I | 3 | −25 | 10 | 7.4 | −0.8 | 128 | 214 |
| J | 3 | −25 | 30 | 7.4 | −0.8 | 132 | 215 |
| K | 3 | −25 | 50 | 7.4 | −0.8 | 170 | 228 |
| L | 3 | −25 | 125 | 8.6 | −1.3 | 192 | 201 |
| M | 2 | −10 | 75 | 8.6 | −1.3 | 147 | 194 |
| N | 2 | −25 | 75 | 8.6 | −1.3 | 199 | 200 |
| O | 3 | −10 | 75 | 8.6 | −1.3 | 169 | 192 |
| P | 3 | −25 | 75 | 8.9 | −1.5 | 213 | 198 |
| Q | 5 | −10 | 75 | 8.8 | −1.5 | 181 | 190 |
| R | 5 | −25 | 75 | 8.6 | −1.3 | 192 | 212 |
| S | 4 | −5 | 125 | 9.6 | −1.5 | 172 | 254 |
| T | 4 | −10 | 125 | 8.4 | −1.0 | 189 | 262 |
| U | 4 | −15 | 125 | 8.1 | −1.0 | 194 | 258 |
| V | 4 | −30 | 125 | 9.0 | −1.3 | 177 | 239 |
| W | 2 | 5 | 125 | 8.2 | −1.0 | 171 | 182 |
| X | 2 | 0 | 125 | 8.4 | −1.1 | 124 | 178 |
| Y | 2 | −5 | 125 | 9.6 | −1.5 | 156 | 235 |
| Z | 2 | −10 | 125 | 8.4 | −1.0 | 175 | 253 |
| AA | 2 | −15 | 125 | 8.1 | −1.0 | 185 | 237 |
| AB | 2 | −30 | 125 | 9.0 | −1.3 | 183 | 234 |

The data gathered was useful in that it provided evidence of the trends which are seen through the use of rapid chocolate cooling conditions. It was noted that this data did include some contradictory values, particularly for gloss. It was believed that these were the result of variation in sample preparation, principally condensation, which resulted in experimental error.

Specific samples did highlight the capability of rapid cooling to produce samples of excellent 4 day gloss (defined as above 190) as in examples A, E, L, N, P, R and U. The tendency was for the high cooling rates provided by higher H-values, over longer times appeared to deliver the best gloss performance. It was surprising to note, however, this tendency was not completely obvious in this set of results. Where a cooling temperature of −30° C. was used, gloss levels were lower than those observed with samples prepared at similar, but warmer, conditions, for example, samples E and F, U and V. It was believed that higher gloss levels for colder temperatures were not observed in these cases due to uncontrolled condensation upon the surfaces of the bars as they were wrapped.

The tendency for increased cooling rates providing better gloss was demonstrated with the pair samples: M and N, O and P, Q and R, where the cooler sample at −25° C. always showed enhanced gloss over the warmer sample. This trend was further supported by the observation of increased gloss from increased cooling rate provided by increasing H-values in samples I through L. This same data also showed that inappropriate selection of combinations of cooling conditions could lead to poor gloss, as Sample I, and that the resultant cooling rate (obtained through a combination of factors including temperature, H-value, chocolate thickness and temper) was a key factor in determining gloss.

Samples M, O and Q also indicated that selection of appropriate cooling time for a given product and set of cooling conditions was contributing to generating enhanced gloss performance.

Example 9

It was demonstrated that it is possible to generate surface robustness on chocolate confections without resulting in unacceptable gloss levels, i.e., perceived as drier and resistant to melting in the hand, through the use of controlled humidity in the rewarm zone.

Milk Chocolate and centers were prepared as set forth in Example 5. The chocolate was tempered to a typical temper level of about 6 CTU and −0.5 slope as measured by Tricor Tempermeter. The cooling tunnel was comprised as set forth in Example 5 with conditions of −10° C., 3.5 minutes total time and an H-value of 90 W/m$^{2°}$C. The cooled product was rewarmed at fixed conditions of H-value of 90 W/m$^{2°}$C., rewarm time of 20 seconds and variable conditions set forth in Table 9-A. After all tests product was firm enough for wrapping. The bars were tested for surface characteristics. The subjective tests were blind tactile-sensory tests at ambient temperatures of the test products against each other and against a control. All samples were free of visible fat bloom.

TABLE 9-A

| Test Sample | Rewarm Temp | Rewarm Dewpoint | Gloss (2 days) | Gloss (38 Weeks) | Subjective |
|---|---|---|---|---|---|
| Control | 13° C. | −12° C. | 173 | 173 | greasy texture |
| +3° C. DP | 14° C. | +3° C. | 173 | 174 | drier than control 2 days, 28 months |
| +5° C. DP | 14° C. | +5° C. | 165 | 159 | Significantly drier than control 2 days and 28 months |

Example 10

Chocolate and centers are prepared in a manner similar to Example 1. Chocolate is tempered to a standard level of 6 CTU and −0.5 slope as measured by Tricor Tempermeter. The centers are enrobed in the manner set forth in Example 1. The coated centers are then cooled in a tunnel with an operating temperature of 7° C., an H-value of 40 W/m$^{2°}$C.

and a residence time of 8 minutes. The bottoms are set by cooling platens under the belt for 3 minutes at a temperature of 12° C. The cooled confections have a hardness sufficient for wrapping but have a subjectively poor gloss level which does not improve with time. This range where chocolate may be set hard enough for wrapping while not attaining acceptable gloss is herein referred to as the intermediate zone as set forth above.

Example 11

Chocolate and centers are prepared in a manner similar to Example 2. Chocolate is tempered to a standard level of 6 CTU and −0.5 slope as measured by Tricor Tempermeter. The centers are enrobed in the manner set forth in Example 2. The coated centers are then cooled in a tunnel with an operating temperature of 17° C., an H-value of 40 W/m²°C. and a residence time of 5 minutes. The bottoms are set by cooling platens under the belt for 3 minutes at a temperature of 12° C. The cooled confections are not hard enough to wrap. The surface of the chocolate is tacky and melts to the touch.

Example 12

A cooled confection is prepared in a manner similar to that set forth in Example 3. At the point of exiting the cooling zone the product is wrapped in a dehumidified atmosphere with a dewpoint of −10° C. and is allowed to rewarm slowly. The rewarm rate is controlled such that the surface and bulk of the chocolate, at approximately 0° C. exiting the cooling zone, reach final ambient temperature in 48 hours. This rewarm rate is approximately 0.5° C./ hour. The resulting chocolate confection shows increased bloom resistance when compared to faster rewarmed product as measured by number of bloom test cycles before bloom in evident. The bloom cycles being defined as 8 hours at 30° C. (86° F.) and 16 hours at 21.° C. (70° F.).

Example 13

Milk Chocolate (not United States Standard of Identity) is prepared by the method set forth in Example 1 using the formulation in Table 13-A below:

TABLE 13-A

| Milk Chocolate Formulation with Coberine | |
|---|---|
| Sucrose | 45.00% |
| Skim Milk Powder | 19.50% |
| Cocoa Butter | 13.89% |
| Chocolate Liquor | 12.00% |
| Coberine | 5.00% |
| Anhydrous Milk Fat | 4.00% |
| Lecithin | 0.60% |
| Vanillin | 0.01% |

Coberine is a cocoa butter equivalent originally invented and patented (1961) by Unilever that is in widespread use throughout the world outside the United States where allowed.

The chocolate is tempered, centers are prepared and enrobed, coated centers are cooled and rewarmed as set forth in Example 3. The resultant set chocolate confection exiting the tunnel has a glossy surface and is sufficiently firm to be wrapped/packaged without significant deformation or abrasion. The finished pieces are then wrapped or packaged in an environment with a temperature of 20 ° C. with a dewpoint of 15° C. The resultant chocolate confection is also bloom stable.

Example 14

A chocolate-like product is prepared by the method set forth in Example 1 using the formulation in Table 14-A below:

TABLE 14-A

| "Chocolate" Coating Formulation | |
|---|---|
| Sucrose | 48.00% |
| Cocoa Butter Equivalent (Coberine) | 21.50% |
| Whole Milk Powder | 20.00% |
| Chocolate Liquor | 10.00% |
| Lecithin | 0.50% |

The coating is tempered, centers are prepared and enrobed, coated centers are cooled and rewarmed as set forth in Example 3. The resultant set chocolate confection exiting the tunnel has a glossy surface and is sufficiently firm to be wrapped/packaged without significant deformation or abrasion. The finished pieces are then wrapped or packaged in an environment with a temperature of 20° C. with a dewpoint of 15° C. The resultant chocolate confection is also bloom stable.

Example 15

A chocolate was prepared with a formulation similar to that set forth in Table 15-A in a manner similar to that set forth in Example 1.

TABLE 15-A

| "Chocolate" Coating Formulation | |
|---|---|
| Sucrose | 47.00% |
| Whole Milk Powder | 18.49% |
| Cocoa Butter | 17.5 |
| Chocolate Liquor | 12.00% |
| Whey Powder | 2.5% |
| Anhydrous Milkfat | 2.0% |
| Lecithin | 0.50% |
| Vanillin | 0.01% |

The chocolate was tempered to a level of about 3 CTU (C°) and −0.5 slope. The chocolate was enrobed onto centers in the manner as described in Example 1. The centers were comprised of a hollow cookie wafer tube 11.5 mm in diameter and 100 mm long The internal diameter of the cookie tube was 8.5 mm. The cookie wafer tube was filled with a white cream comprised of vegetable fat, sugar and flavorings. The centers were coated to a thickness of 0.5 to 2 mm. The coated centers were then cooled in a tunnel by sprayed liquid nitrogen and turbulence fans with a resultant H-value of 75 W/m²°C. operating at conditions set forth in table 15-B below.

The results of the various conditions are also noted in Table 15-B. Samples were rewarmed using two rewarm rates: a slow rewarm rate of 2° C./min, and a faster rewarm rate 4° C./min. The slower rewarm rate samples retained gloss at 20° C., while surface gloss was lost at 18–19° C.

TABLE 15-B

| Sample | Tunnel Temp | Tunnel Time | Results |
|---|---|---|---|
| 15-A | −10° C. | 2.5 minutes | Acceptable Product |
| 15-B | −20° C. | 2.0 minutes | Acceptable Product |

TABLE 15-B-continued

| Sample | Tunnel Temp | Tunnel Time | Results |
|---|---|---|---|
| 15-C | −30° C. | 2 minutes | Cracked Chocolate (unacceptable) |
| 15-D | −30° C. | 1 minute | Acceptable product |

It is believed the cracking exhibited in Sample 15-C was caused by differential rates of contraction upon cooling and/or differential expansion rates on warming between the chocolate and the cream and/or cookie.

Example 16

A white chocolate is prepared in the manner set forth in Example 1 with a reduced dry conge time of 2 hours and the formulation as set forth in Table 16-A below:

TABLE 16-A

White Chocolate Formulation

| | |
|---|---|
| Sucrose | 48.00% |
| Cocoa Butter Equivalent | 21.50% |
| Whole Milk Powder | 20.00% |
| Chocolate Liquor | 10.00% |
| Lecithin | 0.50% |

Centers are prepared and enrobed as set forth in Example 1. The centers are then cooled and rewarmed as set forth in Example 3. The finished white chocolate coated confection is glossy and sufficiently firm for wrapping.

Example 18

Chocolate is prepared and tempered as set forth in Example 3. Centers are prepared and enrobed as set forth in Example 3. The coated centers transfer to belt (Ameraal Ropanyl) and pass through a transition zone with conditions of 31° C. and −20° C. dewpoint. The centers enter the cooling zone and during the first 30 seconds are exposed to an environment with a temperature of −20° C., an H-value of 125 W/m$^2$°C. and a dewpoint of about −30° C. The belt is in good contact with a metal plate. After 30 seconds the bars pass into a second section of the tunnel/process, which is either a new section or an existing conventional tunnel, where they are conditioned for the next 4.5 minutes with an environment of a temperature of about 10–14° C. at a dewpoint of −20° C. and with an H-value of 45 W/m$^2$°C. Also, in the second section of the tunnel, the bars are conveyed over refrigerated platens at a temperature of 12° C. in good contact with the belt. The bars exit the tunnel and enter wrapping room with environmental conditions of 20° C. and a dewpoint of 10° C. The bars are glossy and sufficiently firm for wrapping and bloom stable. This example uses highly effective cooling conditions to accomplish cooling of the chocolate confection to the optimum temperature for crystallization. A semi-solid surface skin is provided on the surface of the product to ensure good gloss characteristics in the first section of the tunnel. The product is then cooled in the second section of the tunnel which is operated at conditions to promote crystal growth and increased rate of solidification.

Example 19

A coating is prepared using Caprenin® (reduced calorie confectionery fat) as set forth in U.S. Pat. No. 5,275,835, Example 1. The coating is not tempered as set forth in the example, but instead is cooled directly from storage temperature of 45° C. to 32° C. and pumped to the enrober. Centers are prepared and enrobed as set forth in Example 3. The centers are then cooled and rewarmed as set forth in Example 3 with cooling tunnel conditions of −40° C., H-value of 125 W/m$^2$°C. The finished confection is wrapped within 5 minutes while it is sufficiently firm and allowed to quickly (1–2 hours) warm to ambient temperature of 20° C. The caprenin based coating shows some characteristics attributable to softening and blooms severely within 2 weeks storage at ambient conditions.

Example 20

A test was performed to compare the bloom stability of a conventionally cooled finished chocolate confections with rapidly cooled samples.

A finished chocolate confection was prepared in a manner similar to that set forth in Example 1. The centers were 120 mm long, 27.6 mm wide and 16 mm high. This was the conventionally cooled sample.

A finished chocolate confection was prepared in a manner similar to that set forth in Example 5. The centers were 120 mm long, 27.6 mm wide and 16 mm high. The average center temperature was 19.7° C. prior to enrobing. The centers were enrobed as outlined in Example 1 to a final chocolate percentage the same as the conventionally cooled sample: 40% by weight of the total confection and an average thickness of 2.5 mm. The chocolate temper was 6.8 CTU and −0.5 slope, cooling tunnel total residence time was 3.42 minutes at average operating temperature of −14.8° C. and average H-value of about 90 W/m$^2$°C., bottom cooling platen average temperature of −34.5° C. and 53 second residence time.

Figure 16:
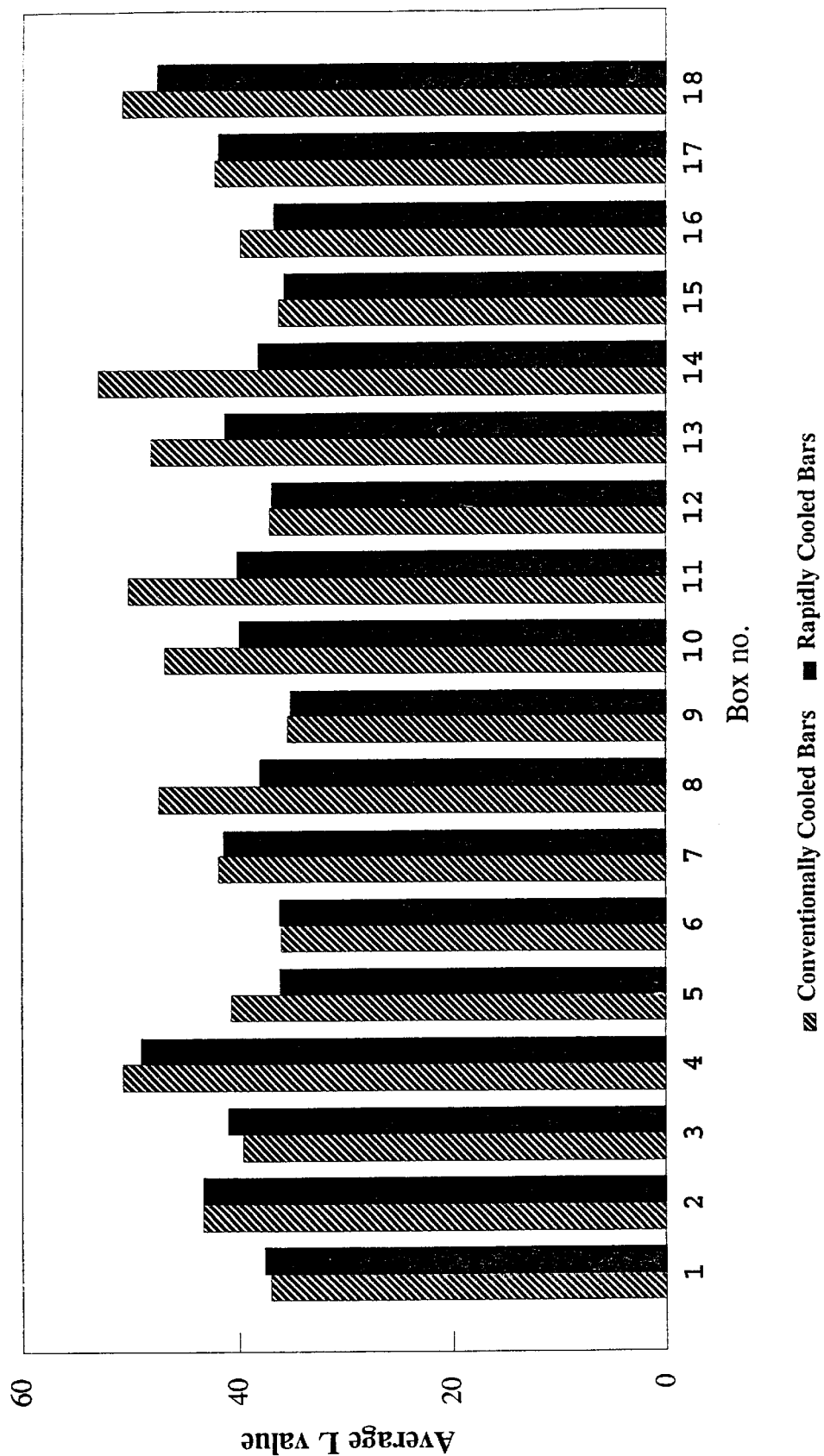
FIG. 16 is a vertical bar graph illustrating bloom values for chocolate enrobed confectionery products made by conventional methods compared with bloom values for products made according to one embodiment of the invention wherein higher L values denote greater fat bloom.

The samples were then wrapped and packed together such that the bars were packed into 36-count cartons in an alternating, checkerboard-style pattern. The sample were then shipped to Tel Aviv, Israel for in-shop testing. The climate and shop practices in Israel tend to increase the likelihood of chocolate confections to bloom because of severe thermal stressing and/or thermal cycling. The shops were generally not air-conditioned. If the shops were air-conditioned, the air-conditioning was usually turned off at night. The thermal cycling caused the finished bars to experience a daily range of temperatures. Accordingly, the thermal conditions the confections were exposed to were fairly severe. The bars were left in the shops for 6 weeks. The samples were then analyzed optically with a Minolta Colorimeter for bloom. Among the values measured, the Lightness or L-value was determined to be the most reliable analytical method of measuring bloom, with a value of 40 and above indicating visible, undesirable bloom. The results of that test were recorded in FIG. 16. The data in FIG. 16 showed that the rapidly cooled bars tended to bloom less than conventionally cooled bars. In addition, in 5 cases, the rapidly cooled bars did not show bloom whereas conventionally cooled bars did show bloom.

These results confirmed that the use of rapid cooling according to the invention provides a chocolate confection that exhibits the same or better resistance to thermal cycling bloom over a broad range of stressing environment.

The above description of the invention is intended to be illustrative and not limiting. Various changes or modifications in the embodiments described may occur to those skilled in the art. These can be made without departing from the spirit or scope of the invention.

What is claimed is:

1. A method of producing a bloom stable chocolate confection having a continuous fat phase and at least one glossy outer surface and containing a temperable fat material, wherein the temperable fat material consists of naturally occurring fats and oils, without the use of a mold comprising the step of cooling a tempered chocolate composition having a liquid fat phase in a convective cooling environment having an operating temperature less than 0° C. and a convective heat transfer coefficient effective to solidify at least a portion of the liquid fat phase to form a cooled chocolate confection having a surface gloss value greater than 150 and which is substantially equivalent to or higher than that of a chocolate, having the same temper, cooled in a conventional cooling environment wherein the operating temperature is no lower than 10° C.

2. The method of claim 1, wherein said operating temperature is less than −5° C.

3. The method of claim 1, wherein said operating temperature is less than −10° C.

4. The method of claim 1, wherein said operating temperature is less than −15° C.

5. The method of claim 1, wherein said cooling is achieved using a convective heat transfer coefficient greater than about 30 W/m$^2$°C.

6. The method of claim 1, wherein said chocolate confection is a coating having a mean thickness greater than 1 mm.

7. The method of claim 1, wherein the temperable fat material comprises cocoa butter.

8. The method of claim 1, wherein said tempered chocolate composition is formed by adding seeding agents to a chocolate composition containing a liquid fat phase at a seed addition temperature.

9. The method as claimed in claim 1, wherein said cooled chocolate is subsequently subjected to a rewarm treatment in a rewarm environment after said cooling.

10. The method of claim 9, wherein said rewarm environment has a rewarm temperature greater than or equal to about 7° C.

11. The method of claim 9, wherein the rewarm environment has a heat transfer coefficient of greater than about 30 W/m$^2$°C.

12. The method of claim 9, wherein the rewarm treatment is for a period of time less than about 1.5 minutes.

13. The method as claimed in claim 1, wherein said cooled chocolate is subjected to a slow warming treatment to increase the average bulk temperature of the cooled chocolate to ambient temperature after said cooling.

14. The method according to claim 1, wherein said conventional cooling environment includes using a convective heat transfer coefficient between 10 and 50 W/m$^2$°C. and a coolant temperature no lower than 10° C. for a period of time greater than 7.5 minutes.

15. The method according to claim 14, wherein said conventional cooling environment is used to cool the chocolate from 30° C. to 20° C.

16. The method according to claim 1, wherein said gloss value is about 160.

17. The method according to claim 1, wherein said gloss value is about 175.

18. A method of producing a bloom stable chocolate confection having a continuous fat phase containing a temperable fat material without the use of a mold comprising the step of cooling a tempered chocolate composition having a liquid fat phase in an initial cooling environment having an average convective heat transfer coefficient greater than 30 W/m$^2$°C., and an operating temperature less than 0° C. wherein the temperable fat material consists of naturally occurring fats and oils.

19. The method of claim 1 or 18, wherein said cooling is achieved predominantly by gaseous convection.

20. The method of claim 1 or 18, wherein said cooling is achieved using a convective heat transfer coefficient greater than about 50 W/m$^2$°C.

21. The method of claim 1 or 18, wherein said cooling is achieved using a convective heat transfer coefficient greater than about 75 W/m$^2$°C.

22. The method of claim 1 or 18, wherein said cooling is achieved using a convective heat transfer coefficient greater than about 100 W/m$^2$°C.

23. The method of claim 1 or 18, wherein said cooling is achieved in a period of time less than 5 minutes.

24. The method of claim 1 or 18, wherein said cooling is achieved in a period of time less than 3 minutes.

25. The method as claimed in claim 1 or 18, wherein said tempered chocolate composition is of low temper and said cooling is achieved in a period of time less than 5 minutes.

26. The method as claimed in claim 1 or 18, wherein said tempered chocolate composition is of ultra-low temper and said cooling is achieved in a period of time less than 5 minutes.

27. The method as claimed in claim 1 or 18, wherein said cooling is achieved using a mixture of gases to deliver high convective transfer coefficient.

28. The method of claim 1 or 18, wherein said chocolate is enrobed onto an edible product prior to said step of cooling and subsequently cooled to form a set chocolate coating.

* * * * *

UNITED STATES PATENT AND TRADEMARK OFFICE
CERTIFICATE OF CORRECTION

PATENT NO. : 6,419,970 B1
DATED : July 16, 2002
INVENTOR(S) : Neil A. Willcocks et al.

It is certified that error appears in the above-identified patent and that said Letters Patent is hereby corrected as shown below:

Title page,
Item [56], U.S. PATENT DOCUMENTS, "Jeffrey" should read -- Jeffery --.
FOREIGN PATENT DOCUMENTS, delete "GB  620417  8/1949".

Column 2,
Line 51, "It" should be deleted.

Column 4,
Line 35, "a" should read -- an --.

Column 12,
Line 36, "caprenin" should read -- Caprenin® --.

Column 17,
Line 16, "prior" should read -- period --.

Column 18,
Line 12, "grown" should read -- growth --.

Column 24,
Line 30, "an" should read -- a --.

Column 32,
Line 35, "minutes" should read -- minute --; and
Line 36, "second" should read -- seconds --.

Column 37,
Line 66, "Technology,by" should read -- Technology, by --.

Column 45,
Line 34, "in" should read -- is --.

Column 46,
Line 47, "long" should read -- long. --.

UNITED STATES PATENT AND TRADEMARK OFFICE
CERTIFICATE OF CORRECTION

PATENT NO.    : 6,419,970 B1
DATED         : July 16, 2002
INVENTOR(S)   : Neil A. Willcocks et al.

It is certified that error appears in the above-identified patent and that said Letters Patent is hereby corrected as shown below:

<u>Column 48,</u>
Line 37, "sample" should read -- samples --.

Signed and Sealed this

Fifteenth Day of July, 2003

JAMES E. ROGAN
*Director of the United States Patent and Trademark Office*